(12) United States Patent
Imai

(10) Patent No.: US 8,464,330 B2
(45) Date of Patent: *Jun. 11, 2013

(54) AGENT DEVICE, IMAGE-FORMING-DEVICE MANAGEMENT SYSTEM, IMAGE-FORMING-DEVICE MANAGEMENT METHOD, IMAGE-FORMING-DEVICE MANAGEMENT PROGRAM AND STORAGE MEDIUM

(75) Inventor: Tatsuya Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 625 days.

This patent is subject to a terminal disclaimer.

(21) Appl. No.: 12/335,386

(22) Filed: Dec. 15, 2008

(65) Prior Publication Data

US 2009/0106418 A1 Apr. 23, 2009

Related U.S. Application Data

(63) Continuation of application No. 10/366,610, filed on Feb. 14, 2003, now Pat. No. 7,480,937.

(30) Foreign Application Priority Data

| | | |
|---|---|---|
| Feb. 26, 2002 | (JP) | 2002-049056 |
| Feb. 26, 2002 | (JP) | 2002-049062 |
| Feb. 26, 2002 | (JP) | 2002-049068 |
| Mar. 25, 2002 | (JP) | 2002-084081 |
| Feb. 4, 2003 | (JP) | 2003-027380 |
| Feb. 4, 2003 | (JP) | 2003-027381 |
| Feb. 4, 2003 | (JP) | 2003-027382 |

(51) Int. Cl.
*H04L 29/06* (2006.01)

(52) U.S. Cl.
USPC .......... 726/11; 726/12; 726/13; 726/14; 726/15; 713/151; 713/152; 713/153; 713/154; 713/155

(58) Field of Classification Search
USPC .......................................................... 726/11
See application file for complete search history.

(56) References Cited

U.S. PATENT DOCUMENTS

| | | | |
|---|---|---|---|
| 5,768,483 A | * | 6/1998 | Maniwa et al. ............... 358/1.15 |
| 6,314,476 B1 | | 11/2001 | Ohara |
| 6,349,336 B1 | | 2/2002 | Sit et al. |
| 6,362,894 B1 | * | 3/2002 | Shima .......................... 358/1.15 |
| 6,449,663 B1 | | 9/2002 | Carney et al. |
| 6,859,832 B1 | * | 2/2005 | Gecht et al. ................... 709/224 |
| 6,915,337 B1 | | 7/2005 | Motoyama et al. |
| 6,915,342 B1 | | 7/2005 | Motoyama |

FOREIGN PATENT DOCUMENTS

| | | |
|---|---|---|
| EP | 0 675 427 A2 | 10/1995 |
| JP | 7-271527 | 10/1995 |
| JP | 09-016435 | 1/1997 |
| JP | 09-083641 | 3/1997 |

(Continued)

*Primary Examiner* — Longbit Chai
(74) *Attorney, Agent, or Firm* — Dickstein Shapiro LLP

(57) ABSTRACT

An agent device is connected with one or more image-forming devices in a local network having a firewall provided therein. A management device carries out remote management of the image-forming devices in the local network through the Internet. The agent device includes a command receiving unit which starts connection with the management device and receives a management command from the management device via the firewall, the command being sent by the management device in response to the connection. An image-forming-device communication unit receives device-state information of a corresponding one of the image-forming devices according to the management command. A command response transmitting unit transmits the device-state information to the management device through the Internet.

15 Claims, 16 Drawing Sheets

FOREIGN PATENT DOCUMENTS

| | | |
|---|---|---|
| JP | 10-105502 A | 4/1998 |
| JP | 11-096096 | 4/1999 |
| JP | 2000-333270 | 11/2000 |
| JP | 2001-105689 A | 4/2001 |
| JP | 2001-154953 | 6/2001 |
| JP | 2001-249885 A | 9/2001 |
| JP | 2001-273211 | 10/2001 |
| JP | 2001-309454 A | 11/2001 |
| JP | 2002-026921 | 1/2002 |
| JP | 2002-032277 | 1/2002 |
| JP | 2002-040886 | 2/2002 |
| JP | 2002-057721 | 2/2002 |
| WO | WO 02/45373 A2 | 6/2002 |

* cited by examiner

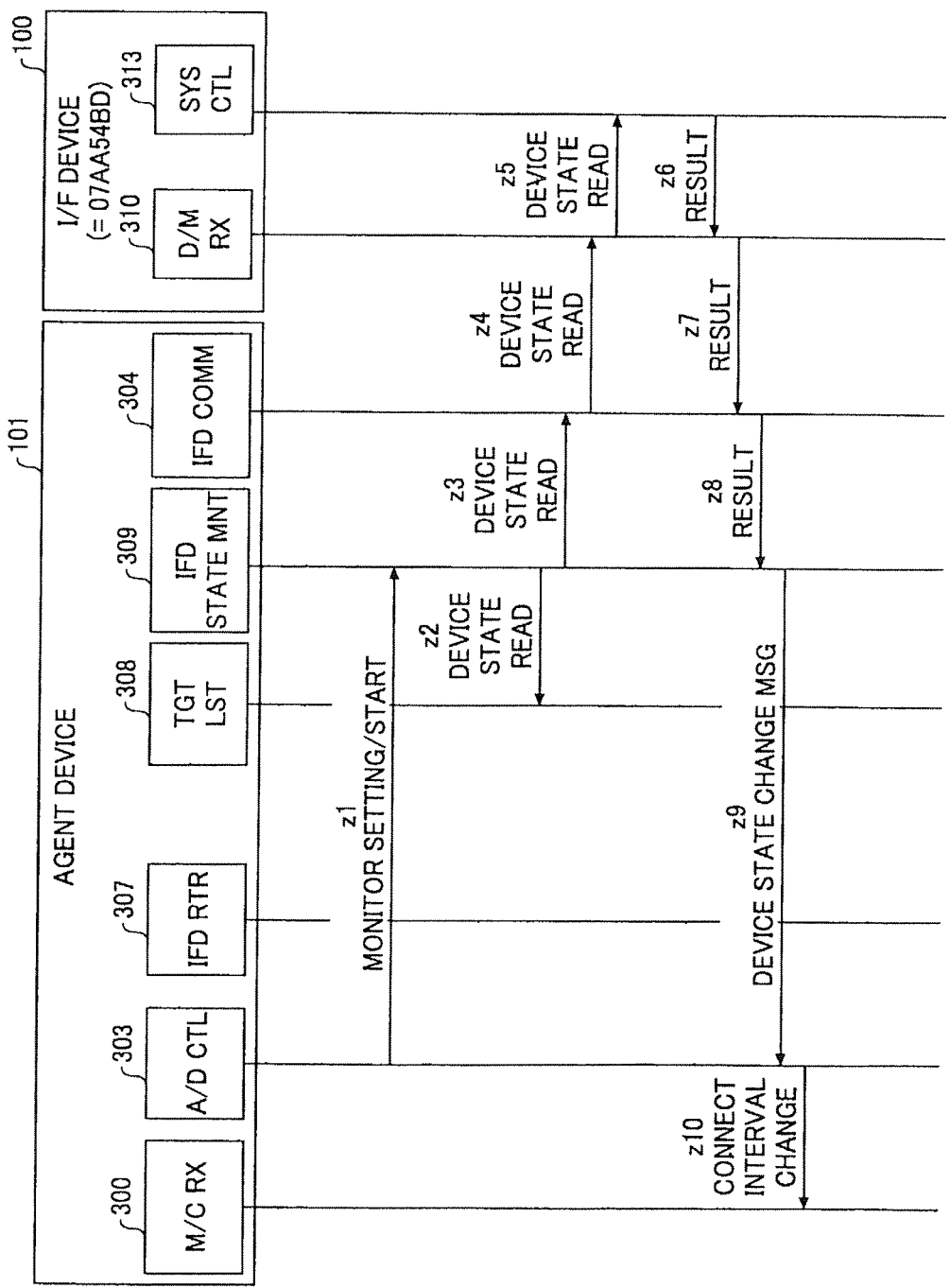

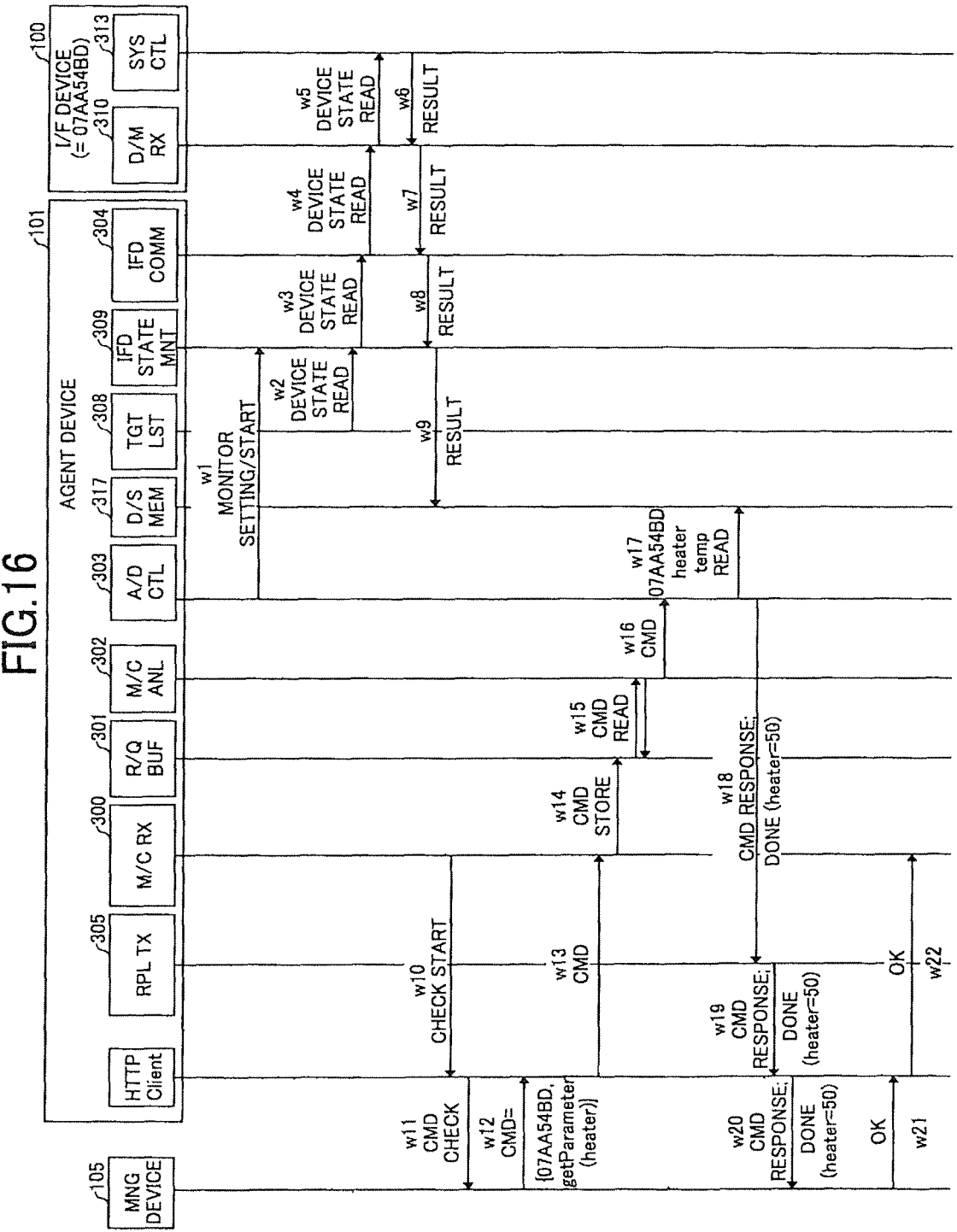

AGENT DEVICE, IMAGE-FORMING-DEVICE MANAGEMENT SYSTEM, IMAGE-FORMING-DEVICE MANAGEMENT METHOD, IMAGE-FORMING-DEVICE MANAGEMENT PROGRAM AND STORAGE MEDIUM

This is a continuation application of U.S. patent application Ser. No. 10/366,610, filed on Feb. 14, 2003 now U.S. Pat. No. 7,480,937, the entire disclosure of which is incorporated herein by reference.

BACKGROUND OF THE INVENTION

1. Field of the Invention

The present invention relates to an image-forming-device management system which includes a local network in which an agent device is connected with one or more image-forming devices, such as copiers or printers, as well as a management device carrying out remote management of the image-forming devices using Internet connection of the local network. The present invention further relates to an image-forming-device management method, an image-forming-device management program and a storage medium thereof.

2. Description of the Related Art

A conventional image-forming-device management system carries out maintenance management of one or more image-forming devices at the user locations by operation of a remote management device, located at a remote place, through a communication line such as a telephone line.

In performing the remote management using the connection by telephone, the communication cost increases. In order to reduce the communication cost, it is possible to perform remote management using the Internet connection that is made to the remote management device by the user on the local network side.

On the other hand, in local networks, such as corporate networks, there is the possibility that any third person has illegal access, through an external network, such as the Internet, to internal data and programs within the local networks. To avoid this, the firewall is provided in many local networks so that alteration, destruction, etc. may not be performed to the data and programs in the local networks.

If the conventional image-forming-device management system is applied to such a local network, it is difficult to carry out remote management of the image-forming devices in the local network from the remote management device through the Internet, by the presence of the firewall in the local network.

When connecting the remote management device with the image-forming device in the local network having the firewall provided therein using the Internet connection of the local network, direct transmission of a processing request from the management device to the image forming device is impossible in many cases by the presence of the firewall.

The firewall permits the transmission of a request from the user's local network to the Internet and the transmission of its response from the Internet to the local network. However, the firewall does not permit the transmission of a request from the Internet to the user's local network because of the function of the firewall to avoid illegal accessing.

A conceivable method to eliminate the above problem is to change the setting of the firewall such that only a request from the management device to the image-forming device may be passed through the firewall.

However, such change of the firewall setting raises the possibility of making the security level of the firewall lower and increasing the network administrator's burden.

Another conceivable method to eliminate the above problem is to utilize VPN (virtual private network) device that allows only a request from the management device to pass through the firewall to the image-forming device. However, it is necessary to increase the device cost greatly for the use of VPN device in the image-forming-device management system.

Therefore, because of the presence of the firewall, it is difficult for the conventional image-forming-device management system to carry out remote management of the image-forming device in the local network from the management device connected through external networks, such as the Internet, without increasing the device cost greatly.

SUMMARY OF THE INVENTION

An object of the present invention is to provide an image-forming-device management system in which the above-described problems are eliminated.

Another object of the present invention is to provide an image-forming-device management system that is capable of easily performing remote management of one or more image-forming devices by the management device without increasing the equipment cost greatly when the local network is provided with the firewall.

Another object of the present invention is to provide an agent device that allows the management device to easily perform remote management of one or more image-forming devices without increasing the equipment cost greatly when the local network is provided with the firewall.

Another object of the present invention is to provide an image-forming-device management system that allows the management device to speedily perform remote management of one or more image-forming devices when the local network is provided with the firewall and an inappropriate state of the target device is detected.

Another object of the present invention is to provide an agent device that allows the management device to speedily perform remote management of one or more image-forming devices when the local network is provided with the firewall and an inappropriate state of the target device is detected.

Another object of the present invention is to provide an image-forming-device management system that speedily and accurately performs remote management of one or more image-forming devices by the management device without increasing the equipment cost greatly when the local network is provided with the firewall.

Another object of the present invention is to provide a management device that is capable of speedily and accurately performing remote management of one or more image-forming devices without increasing the equipment cost greatly when the local network is provided with the firewall.

The above-mentioned objects of the present invention are achieved by an agent device which is connected with one or more image-forming devices in a local network having a firewall provided therein, the agent device comprising: a command receiving unit which starts connection with a management device that carries out remote management of the image-forming devices in the local network through the Internet, and receives a management command from the management device via the firewall, the management command being sent by the management device in response to the connection; an image-forming-device communication unit which receives device-state information of a corresponding one of the image-forming devices according to the management command received by the command receiving unit; and a command response transmitting unit which transmits the device-state information, received by the image-forming-device communication unit, to the management device through the Internet.

According to the agent device of the present invention, it is possible that the management device performs remote management of the image-forming devices without increasing cost greatly, even when the local network in which the agent device is connected with the image forming devices is provided with the firewall.

According to the agent device of the present invention, the "connection" is a communication procedure for checking the presence of a processing request (management command) transmitted from the management device to the image forming device. For example, the "connection" is carried out by performing polling to the management device by HTTP (Hyper Text Transfer Protocol) connection originated from the agent device. The HTTP is a protocol used to transmit and receive data.

Moreover, according to the agent device of the present invention, the "device-state information" is internal information of an image-forming device. For example, it is the current value of an internal sensor of the image-forming device, the history of previous sensor values, the setting of operation of the device, the history of previous operation of the device, etc.

The above-mentioned objects of the present invention are achieved by an image-forming-device management system including an agent device connected with one or more image-forming devices in a local network having a firewall provided therein, as well as a management device carrying out remote management of the image-forming devices in the local network through the Internet, the agent device comprising: a command receiving unit starting connection with the management device and receiving a management command from the management device via the firewall, the management command being sent by the management device in response to the connection; an image-forming-device communication unit receiving device-state information of a corresponding one of the image-forming devices for the management command received by the command receiving unit; and a command response transmitting unit transmitting the device-state information, received by the image-forming-device communication unit, to the management device through the Internet.

According to the image-forming-device management system of the present invention, it is possible that the management device perform remote management of the image-forming devices without increasing cost greatly, even when the local network in which the agent device is connected with the image forming devices is provided with the firewall.

The above-mentioned objects of the present invention are achieved by an image-forming-device management system including an agent device connected with one or more image-forming devices in a local network having a firewall provided therein, as well as a management device carrying out remote management of the image-forming devices in the local network through the Internet, the agent device comprising: a command receiving unit starting connection with the management device and receiving a management command from the management device via the firewall, the management command being sent by the management device in response to the connection; an image-forming-device communication unit receiving device-state information of a corresponding one of the image-forming devices for the management command received by the command receiving unit; a command response transmitting unit transmitting the device-state information, received by the image-forming-device communication unit, to the management device through the Internet; a device-state monitoring unit determining whether a state of a corresponding one of the image-forming devices meets predetermined monitoring conditions, based on the device-state information received by the image-forming-device communication unit; and a control unit shortening a connection start interval of the command receiving unit when the device-state monitoring unit determines that the state of the corresponding image-forming device does not meet the predetermined monitoring conditions.

According to the image-forming-device management system of the present invention, it is possible that the management device speedily perform remote management of one or more image-forming devices when the local network is provided with the firewall and an inappropriate state of the target device is detected.

The above-mentioned objects of the present invention are achieved by an agent device which is which is connected with one or more image-forming devices in a local network having a firewall provided therein, the agent device comprising: a command receiving unit which starts connection with a management device that carries out remote management of the image-forming devices in the local network through the Internet, and receives a management command from the management device via the firewall, the management command being sent by the management device in response to the connection; an image-forming-device communication unit which receives device-state information of a corresponding one of the image-forming devices according to the management command received by the command receiving unit; a command response transmitting unit which transmits the device-state information, received by the image-forming-device communication unit, to the management device through the Internet; a device-state monitoring unit determining whether a state of a corresponding one of the image-forming devices meets predetermined monitoring conditions, based on the device-state information received by the image-forming-device communication unit; and a control unit shortening a connection start interval of the command receiving unit when the device-state monitoring unit determines that the state of the corresponding image-forming device does not meet the predetermined monitoring conditions.

According to the agent device of the present invention, it is possible that the management device speedily perform remote management of one or more image-forming devices when the local network is provided with the firewall and an inappropriate state of the target device is detected.

The above-mentioned objects of the present invention are achieved by an image-forming-device management system including an agent device connected with one or more image-forming devices in a local network having a firewall provided therein, as well as a management device carrying out remote management of the image-forming devices in the local network through the Internet, the management device comprising: a management application unit including a plurality of management applications each generating a management command which is a request sent to either the agent device or one of the image-forming devices; a request management unit registering the management commands generated by the management application unit; a request transmitting buffer storing the management commands registered by the request management unit; an agent-device communication unit reading one of the management commands from the request transmitting buffer in response to connection started by the agent device, transmitting the read management command to the agent device in the local network via the firewall, and receiving a command response from the agent device in response to the transmitted command; and a command response buffer storing the management command read by the agent-device communication unit, when transmitting the read management command to the agent device.

According to the image-forming-device management system of the present invention, it is possible that the management device speedily and accurately perform remote management of one or more image-forming devices without increasing the equipment cost greatly when the local network is provided with the firewall.

The above-mentioned objects of the present invention are achieved by a management device which uses an agent device connected with one or more image-forming devices in a local network having a firewall provided therein and carries out remote management of the image-forming devices in the local network through the Internet, the management device comprising: a management application unit including a plurality of management applications each generating a management command which is a request sent to either the agent device or one of the image-forming devices; a request management unit registering the management commands generated by the management application unit; a request transmitting buffer storing the management commands registered by the request management unit; an agent-device communication unit reading one of the management commands from the request transmitting buffer in response to connection started by the agent device, transmitting the read management command to the agent device in the local network via the firewall, and receiving a command response from the agent device in response to the transmitted command; and a command response buffer storing the management command read by the agent-device communication unit, when transmitting the read management command to the agent device.

According to the management device of the present invention, it is possible to speedily and accurately perform remote management of one or more image-forming devices without increasing the equipment cost greatly when the local network is provided with the firewall.

BRIEF DESCRIPTION OF THE DRAWINGS

Other objects, features and advantages of the present invention will be apparent from the following detailed description when read in conjunction with the accompanying drawings.

FIG. 15 is a diagram for explaining an example of the procedure of changing the connection interval of the image-forming device by the agent device.

FIG. 16 is a diagram for explaining an example of the procedure of obtaining the device state data of the image forming device stored in the agent device.

DETAILED DESCRIPTION OF PREFERRED EMBODIMENTS

A description will now be provided of the preferred embodiments of the present invention with reference to the accompanying drawings.

Figure 1:
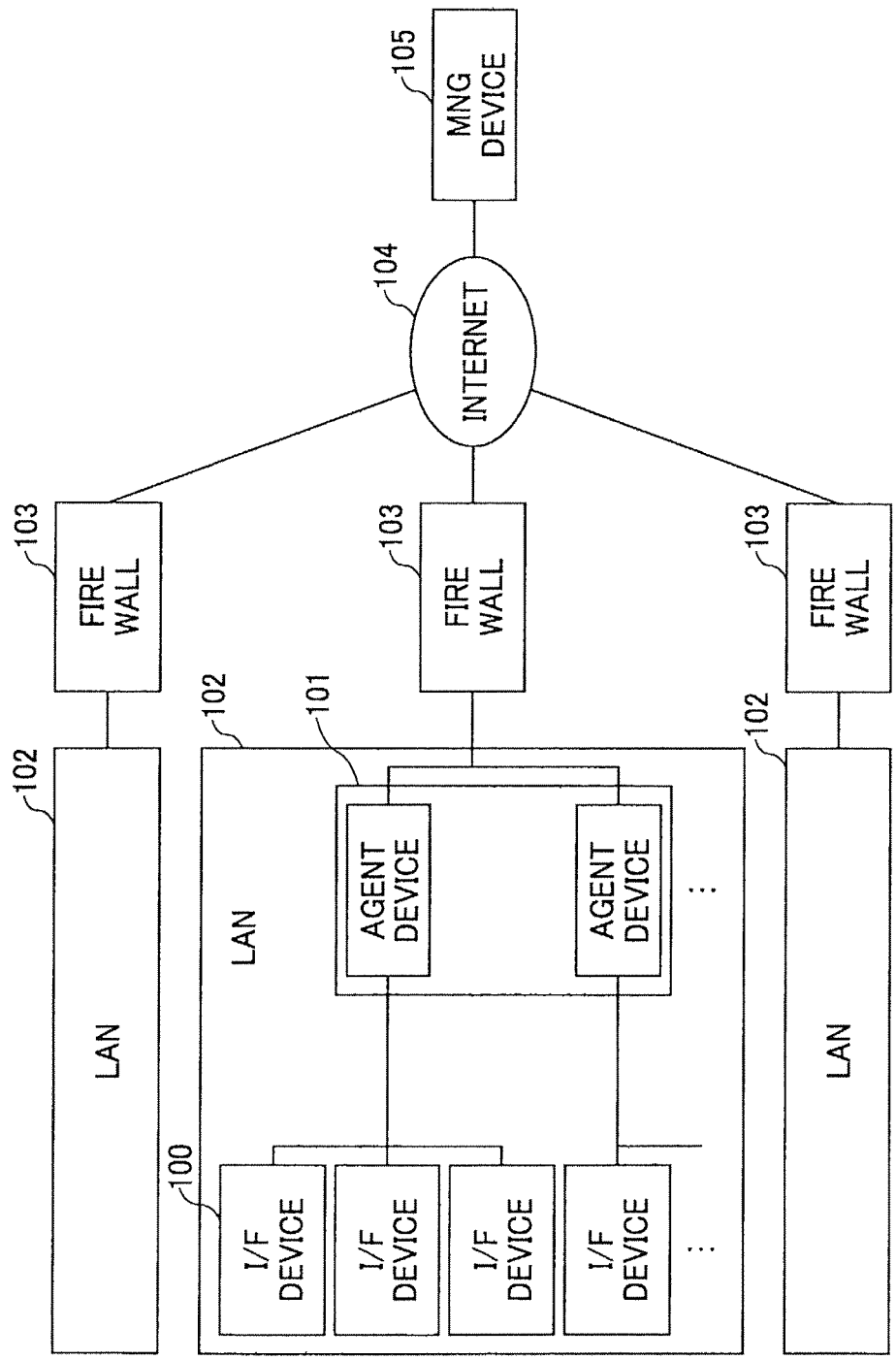
FIG. 1 is a block diagram of one preferred embodiment of the image-forming-device management system of the invention.

FIG. 1 shows one preferred embodiment of the image-forming-device management system of the invention.

As shown in FIG. 1, the image-forming-device management system includes a plurality of image-forming devices 100 in a local network 102 for which remote management is carried out, an agent device 101 connected with the image-forming devices 100 in the same local network 102, and a management device 105 connected to the agent device 101 through the firewall 103 and the Internet 104.

The management device 105 carries out remote management of the image-forming devices 100, connected on the same local network 102 as the agent device 101, through the Internet 104. In the image-forming-device management system, two or more firewalls 103 and two or more management devices 105 may be installed. Moreover, it is possible that two or more agent devices 101 be installed for a single firewall 103.

Figure 2:
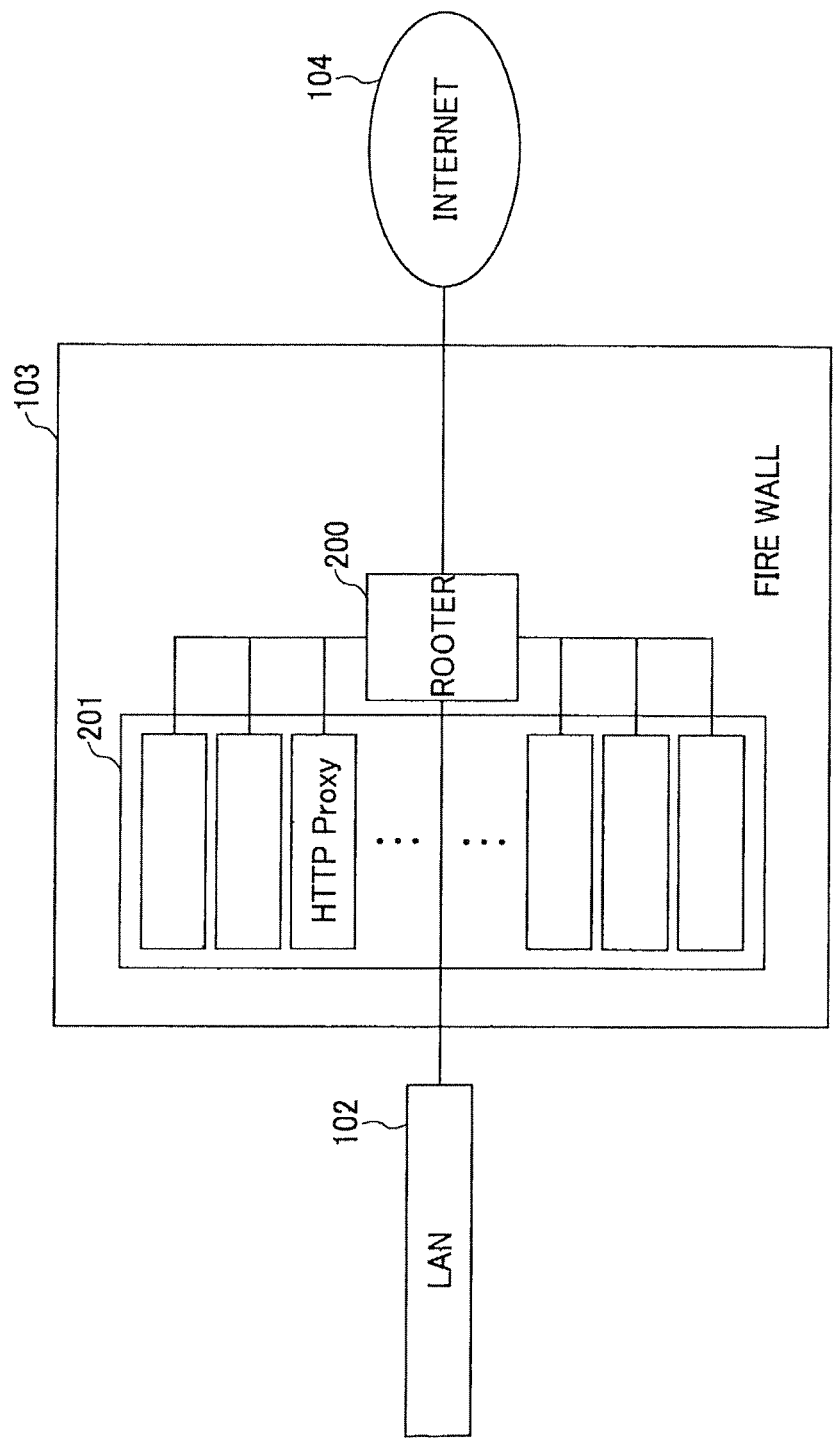
FIG. 2 is a block diagram of an example of the firewall.

FIG. 2 shows an example of the firewall.

As shown in FIG. 2, the firewall 103 includes, for example, a router 200 and an HTTP proxy 201. The HTTP proxy 201 is a substitute computer which makes connection with the Internet 104 instead of a computer within the local network 102 which is not directly connectable with the Internet 104. As previously described, the firewall 103 functions to permit the transmission of a request from the user's local network 102 to the Internet 104 and the transmission of its response from the Internet 104 to the local network 102. However, in order to avoid illegal accessing to internal resources of the local network 102 from the outside, the firewall 102 functions to inhibit the transmission of a request from the Internet 104 to the local network 102.

Figure 3:
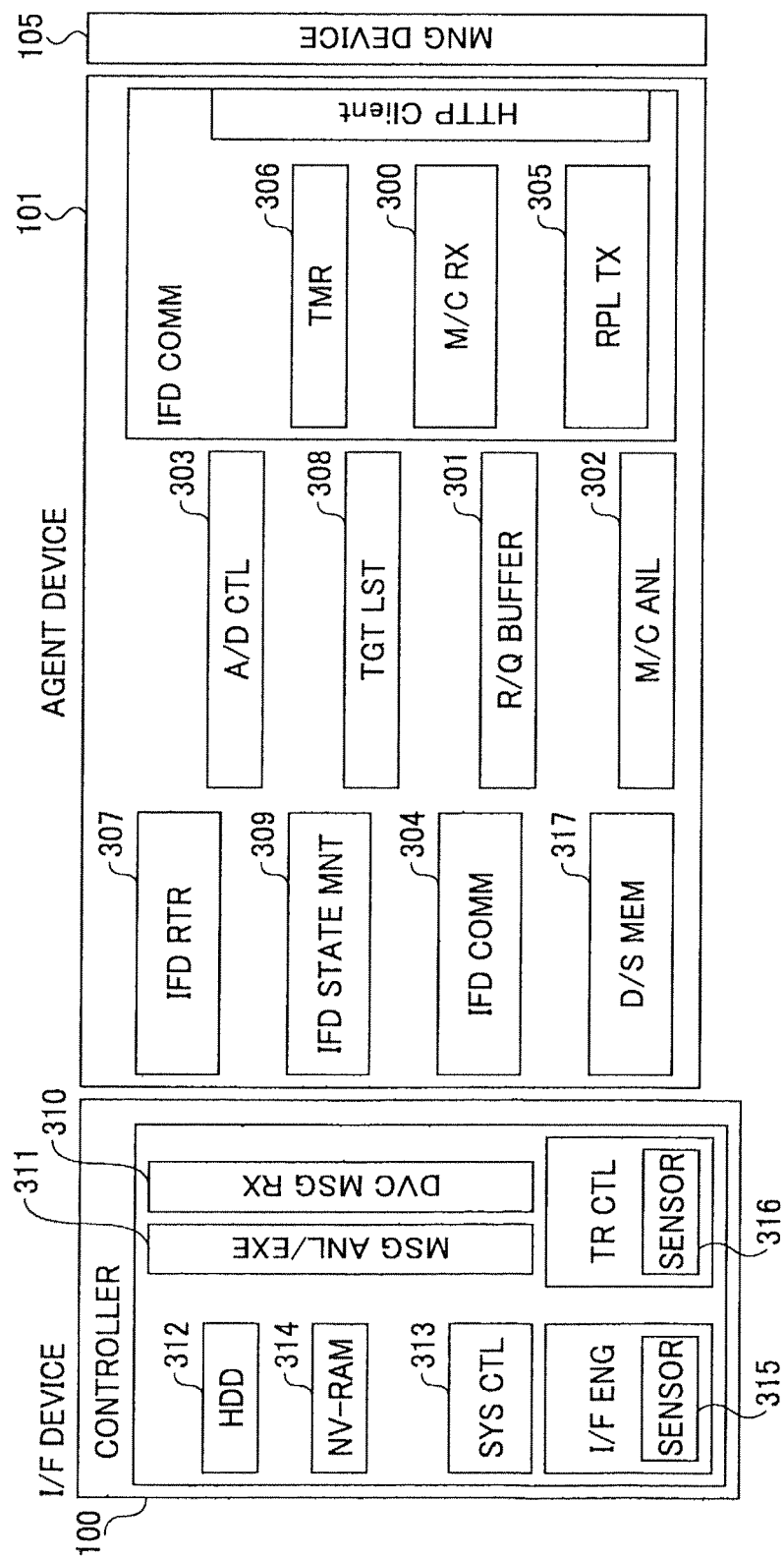
FIG. 3 is a block diagram of one preferred embodiment of the agent device in the image-forming-device management system of the invention.

FIG. 3 shows one preferred embodiment of the agent device in the image-forming-device management system of the invention.

As shown in FIG. 3, the agent device 101 includes a management command receiving unit (M/C RX) 300, a request queue buffer (R/Q BUFFER) 301, a management command analysis unit (M/C ANL) 302, an agent-device control unit (A/D CTL) 303, an image-forming-device communication unit (IFD COMM) 304, a command response transmitting unit (RPL TX) 305, a timer (TMR) 306, an image-forming-device retrieval unit (IFD RTR) 307, a target device list unit (TGT LST) 308, an image-forming-device state monitoring unit (IFD STATE MNT) 309, and a device-state data memory (D/S MEM) 317.

The command receiving unit 300 starts connection with the management device 105 and receives a management command from the management device 105 via the firewall 103, the management command being transmitted by the management device 105 in response to the connection.

The image-forming-device communication unit 304 receives device-state information transmitted by the image forming device 100 according to the received management command.

The command response transmitting unit 305 transmits the device-state information, received by the image-forming-device communication unit 304, to the management device 105 through the Internet.

The management command analysis unit 302 analyzes the management command received by the command receiving unit 300. The request queue buffer 301 stores the management command received by the command receiving unit 300.

The device-state data memory 317 stores respective device-state information of the image-forming devices 100 in the local network 102.

The agent-device control unit 303 executes the management command analyzed by the management command analysis unit 302.

The timer 306 provides time measurement and outputs a signal indicative of the interval between a previous connection start time and a current connection start time.

The image-forming-device retrieval unit 307 performs the retrieval instruction of whether the device information on some image-forming devices 100 is acquired, or to acquire the device information on all the image-forming devices 100 with acquisition starting of the agent-device control unit 303, searches the image-forming device on the local network, and updates the target device list unit 308 by the retrieval result.

The target device list unit 308 stores and retains a list of the device information of the image-forming device 100 received by the image-forming-device communication unit 304 for every image-forming device 100.

The device-state monitoring unit 309 determines whether the state of the image-forming device 100, which is specified by the device information held in the target device list unit 308, is in conformity with certain monitoring conditions. Here, the "device information" is, for example, a network address of the image-forming device in the local network, or a device identifier of the image-forming device. Moreover, the "monitoring conditions" are, for example, the conditions that the period of stop time of the device by failure is less than 10 minute, etc. Namely, when the image-forming device 100 has stopped by failure and 10 minutes have elapsed, it is determined that the monitoring conditions are not met the state of the image-forming device 100.

Moreover, the agent device 101 includes a CPU which controls the processing of the respective elements except the request queue buffer 301 and the target device list unit 308 which are constituted by a memory device.

As shown in FIG. 3, the image-forming device 100 includes a device message receiving unit (DVC MSG RX) 310, a message analysis/statement unit (MSG ANL/EXE) 311, a HDD 312, a system-control unit (SYS CTL) 313, an NV-RAM 314, an image-forming engine (I/F ENG) sensor 315, and a transport control (TR CTL) sensor 316.

The device message receiving unit 310 receives the management command transmitted from the image-forming-device communication unit 304.

The message analysis/execution unit 311 analyzes the management command received by the device message receiving unit 310.

The HDD 312 is a hard disk drive for storing analysis and execution data. The NV-RAM 314 is a non-volatile RAM for storing analysis and execution data.

The system-control unit 313 executes the management command analyzed by the message analysis/execution unit 311.

The image-forming engine sensor 315 detects any imaging error in the image-forming device.

The transport control sensor 316 detects any transport error in the image-forming device. In the image-forming-device management system of the present embodiment, remote management of the image-forming device 100 is attained by the management device 105 using the error detection of the sensors, such as the image-forming engine sensor 315 and the transport control sensor 316, contained in the image-forming device 100.

In the image-forming-device management system of FIG. 3, the management command receiving unit 300 may receive two or more management commands which are transmitted from the management device 105. These commands may include commands sent to both the image-forming device 100 and the agent device 101, or may include commands sent to only one of the two devices.

In other words, the management command receiving unit 300 may receive two kinds of management commands, and one may be the management command sent to the image-forming device 100, and the other may be the management command sent to the agent device 101.

Moreover, a single management command may contain two or more device identifiers set as the target device of the management, and a single management command may contains two or more requests for processing of the target device.

The management command receiving unit 300 is configured to periodically start the connection to management device 105 at the connection start intervals.

For example, suppose that the connection start interval is set to 5 minutes. In such a case, by using the timer 306, the management command receiving unit 300 starts the connection to the management device 105 in every 5 minutes. Here, the periodical connection starting means that the connection between the management command receiving unit 300 and the management device 105 is established at fixed time intervals (or the connection start interval).

The request queue buffer 301 is a volatile memory, such as RAM. The management commands stored into the request queue buffer 301 are held in the request queue buffer 301 in the order in which the management command receiving unit 300 has received the management commands from the management device 105. Alternatively, they are held in different areas of the request queue buffer 301 for every target device.

The management command analysis unit 302 acquires the management commands from the request queue buffer 301 in the order that they are stored into the request queue buffer 301, and transmits each command to the agent-device control unit 303 or the image-forming-device communication unit 304 after the acquisition of the command. Alternatively, the management command analysis unit 302 acquires only the management commands, which are to be sent to specific target devices, preferentially among the stored management commands from the request queue buffer 301, and transmits them to the agent-device control unit 303 or the image-forming-device communication unit 304.

Specifically, when the management commands acquired from the request queue buffer 301 are the requests for processing "heater temperature is set to 50 degrees" of two specific image-forming devices 100, the management command analysis unit 302 transmits the acquired management commands to the image-forming-device communication unit 304 for the two specific image-forming devices 100.

Moreover, the target device identifiers for identifying the two specific image-forming devices 100 are given to the management commands acquired from the request queue buffer 301, in order to perform this distribution.

The agent-device control unit 303 executes the management command which has been transmitted to the agent device 101 by the management command analysis unit 302. For example, the management command which has been transmitted to the agent device 101 may contain a request for reading of the connection start interval setting of the agent device 101.

The agent-device control unit 303 changes the connection start interval. For example, after a fixed time interval has elapsed, the previous setting of connection start interval which is set to 5 minutes is changed to 3 minutes by the agent-device control unit 303.

The device-state monitoring unit 309 sends a request for changing the connection start interval to the agent-device control unit 303 when it is determined that the state of the image-forming device 100 indicated by the device information of the image-forming device 100 stored in the target device list unit 308 does not meet certain monitoring conditions.

In addition to the direct control of the agent-device control unit 303, the connection start interval may be changed in accordance with the request sent to the agent-device control unit 303 from the device-state monitoring unit 309.

Moreover, the agent-device control unit 303 may change the connection start interval in accordance with a request received from the management device 105. For example, the case where the previous connection start interval is set to 5 minutes is considered. The agent-device control unit 303 changes the connection start interval from 5 minutes to 3 minutes in accordance with the request for changing the connection start interval which is received from the management device 105.

The image-forming-device communication unit 304 transmits the management command to two specific image-forming devices 100 when the management command is generated to be sent to the two specific image-forming devices 100.

In this case, the image-forming-device communication unit 304 receives the device information as a response of the management command from the two specific image-forming devices 100 which have received the management command.

The command response transmitting unit 305 transmits a reply signal to the management device 105 when the management command receiving unit 300 receives the management command from the management device 105, the reply signal indicating that the agent device has received the management command from the management device 105.

For example, the reply signal is an acknowledgment signal "accept OK" indicating that the management command from the management device 105 is received at the agent device 101.

When the image-forming-device communication unit 304 receives the command response from the image-forming device 100, the command response transmitting unit 305 transmits the received command response to the management device 105.

For example, the command response which is transmitted to the management device 105 is an indication that the setting of heater temperature to 50 degrees is done.

For example, the agent-device control unit 303 periodically starts monitoring of the image-forming device 100 specified by the device information stored in the target device list unit 308. Here, the periodically starting by the agent-device control unit 303 means that the monitoring process is started repetitively at fixed time intervals. For example, the agent-device control unit 303 starts monitoring of the image-forming device 100 in every 5 minutes.

Moreover, the agent-device control unit 303 shortens the setting of connection start interval to transmit the command check to the management device 105 from 5 minutes to 3 minutes when the device-state monitoring unit 309 determines that the state of the image-forming device 100 does not meet certain monitoring conditions.

Specifically, suppose a case in which the monitoring conditions are that the stop time of the image-forming device by failure must be less than 10 minutes. When the image-forming device 100 has stopped by failure and 10 minutes have passed, it is determined that the state of the image-forming device 100 does not meet the monitoring conditions. The agent-device control unit 303 at this time shortens the connection start interval.

For example, in accordance with the start of acquisition of the device information by the agent-device control unit 303, the image-forming-device communication unit 304 receives the device identifier and the network address of the image-forming device 100 which are associated.

The target device list unit 308 associates the device identifier and the network address of the image-forming device 100 received by the image-forming-device communication unit 304, and stores the same therein.

The image-forming-device retrieval unit 307 performs the retrieval command to acquire the device information of some image-forming devices 100 or to acquire the device information of all the image-forming devices 100. The image-forming-device retrieval unit 307 searches for the image-forming devices in the local network, and updates the target device list unit 308 by the retrieval results.

For example, suppose the case in which five image-forming devices 100 are connected with the agent device 101, and the device identifiers "a1" to "a5" are allotted for these image-forming devices 100. In this case, the image-forming-device retrieval unit 307 may execute the retrieval command to acquires the device information on the two image-forming devices 100 with the device identifiers "a1" and "a2".

Figure 4:
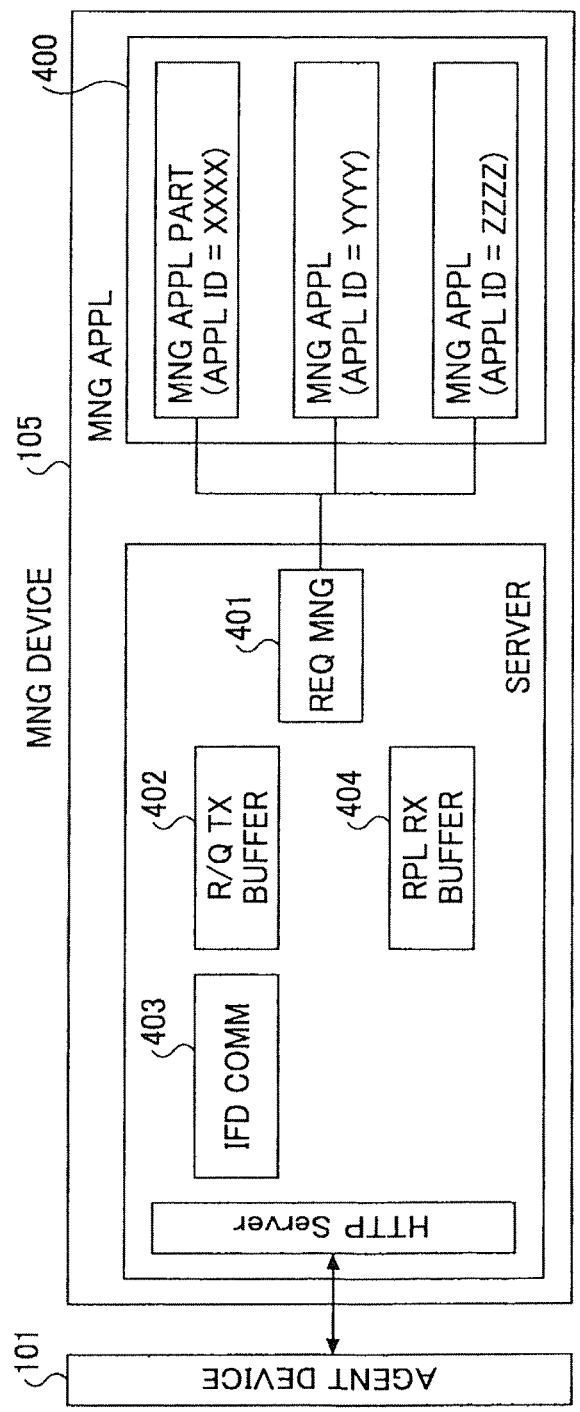
FIG. 4 is a block diagram of one preferred embodiment of the management device in the image-forming-device management system of the invention.

FIG. 4 shows one preferred embodiment of the management device in the image-forming-device management system of the invention.

As shown in FIG. 4, the management device 105 includes a management application unit (MNG APPL) 400, a request management unit (REQ MNG) 401, a request queue transmitting buffer (R/Q TX BUFFER) 402, an image-formingdevice communication unit (IFD COMM) 403, and a command response receiving buffer (RPL RX BUFFER) 404.

In the management device 105 of FIG. 4, the management application unit 400 includes a plurality of management applications each generating a management command which is a request sent to the image-forming device 100 or the agent device 101.

The request management unit 401 registers the management commands generated by the management application unit 400.

The request queue transmitting buffer 402 stores the management commands registered by the request management unit 401.

The agent-device communication unit 403 reads one of the management commands from the request queue transmitting buffer 402 in response to the connection started by the agent device 101, and transmits the read command to the agent device 101 in the local network 102 via the firewall 103. Further, the agent-device communication unit 403 receives a command response from the agent device 101 as a response to the transmitted management command.

The command response receiving buffer 404 stores the management command read by the agent-device communication unit 403, when transmitting the read management command to the agent device 105.

In the management device 105 in FIG. 4, the management application unit 400 may be constituted by, for example, operator-terminal screen control processing units started by respective operators. Alternatively, the management application unit 400 may be constituted by batch-processing units which are automatically booted periodically or by scheduling.

Each of the management commands that are generated by the management applications in the management application unit 400 contains a command identifier (command ID) for discriminating each to management command. Each command identifier includes an application identifier (application ID) for discriminating the management application as the source application that has generated the management command of concern.

The request management unit 401 transmits the received command response to one of the management applications which is indicated by the command identifier as the source application having generated the corresponding management command, when it is determined that the command identifier contained in the command response received by the agent-device communication unit 403 is the same as the command identifier of the management command stored in the command response receiving buffer 404.

For example, suppose a case in which the command identifiers contained in the command response received by the agent-device communication unit 403 is "XXXX, 1", and the command identifiers of the management command stored in the command response receiving buffer 404 is "XXXX, 1". In this case, both the command identifiers are the same, and the request management unit 401 transmits the received command response to the management application (which application identifier=XXXX) which is the source application having generated the corresponding management command.

Figure 6:
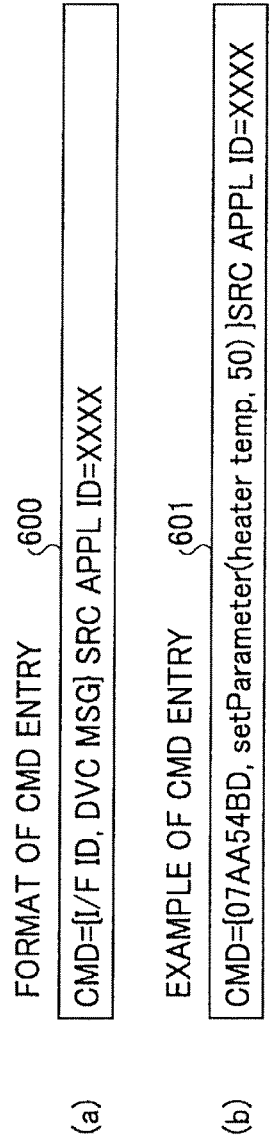
FIG. 6 is a diagram for explaining the format of a management command.

FIG. 6 shows the format of a management command.

As indicated by (a) in FIG. 6, the format 600 of the command entry for the management command includes a target device identifier at the first place and a device message at the second place. The target device identifier is an identifier of the target image-forming device for the management command. The device message is a message of the request sent to the target image-forming device.

As indicated by (b) in FIG. 6, according to the example 601 of the command entry, the target device identifier is "07AA54BD", and the device message is "setParameter (heater temperature, 50)."

For example, the target device identifier "07AA54BD" is the serial number of the target image-forming device, and the device message "setParameter (heater temperature, 50)" means that it is requested to set the heater temperature of the target image-forming device to 50 degrees.

Figure 5:
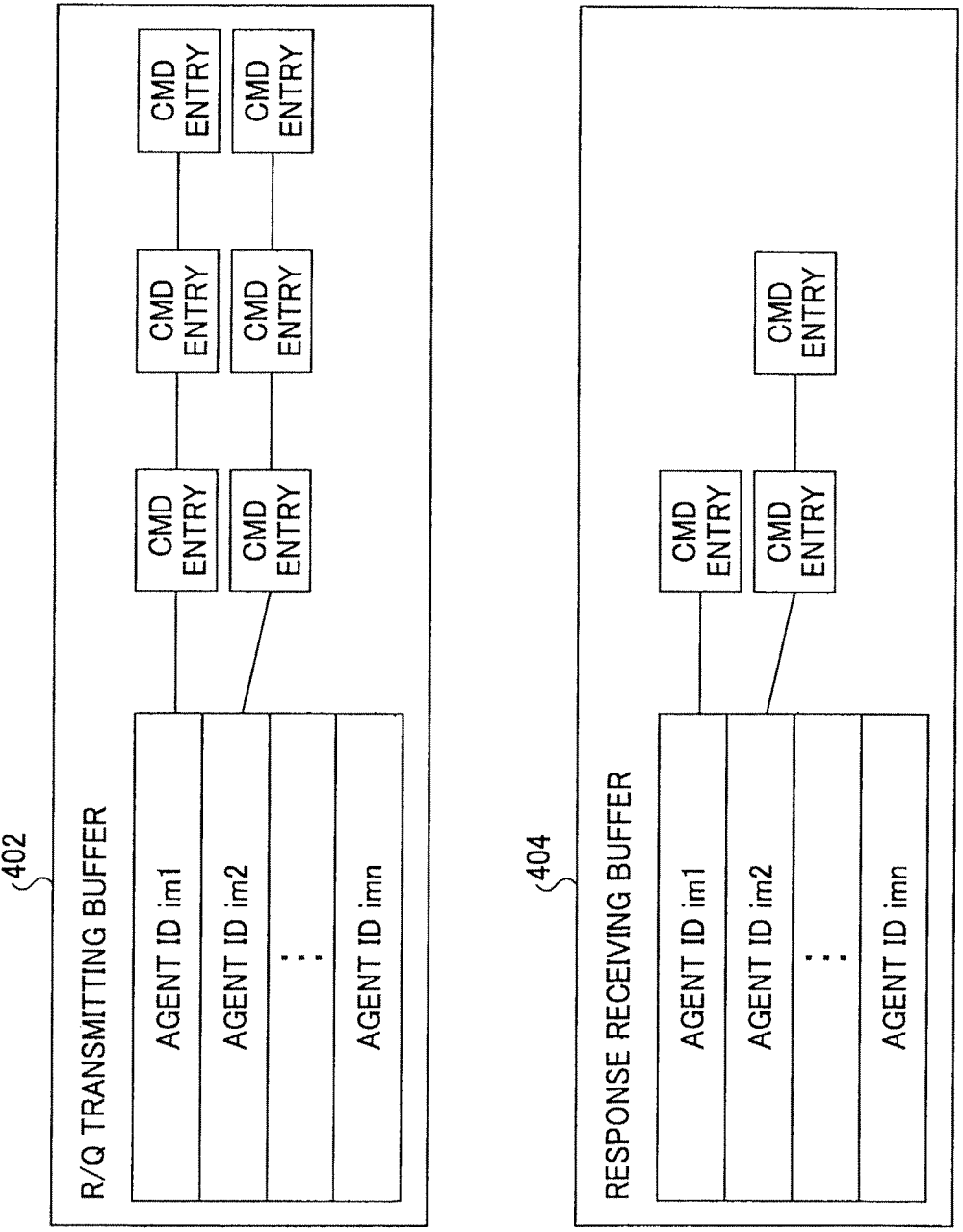
FIG. 5 is a diagram showing an example of commands retained in a request queue transmitting buffer and a response queue receiving buffer.

FIG. 5 shows examples of commands retained in the request queue transmitting buffer 402 and the command response receiving buffer 404.

As shown in FIG. 5, when two or more agent devices 101 exist, command entries in the request queue transmitting buffer 402 of the management device 105 are arranged for every identifier of the agent devices 101, and, for each agent device 101, a set of management commands which are command entries for that agent device are accompanied with the device identifier of that agent device.

Similarly, the command response receiving buffer 404 is arranged in the same manner as the request queue transmitting buffer 402.

Figure 7:
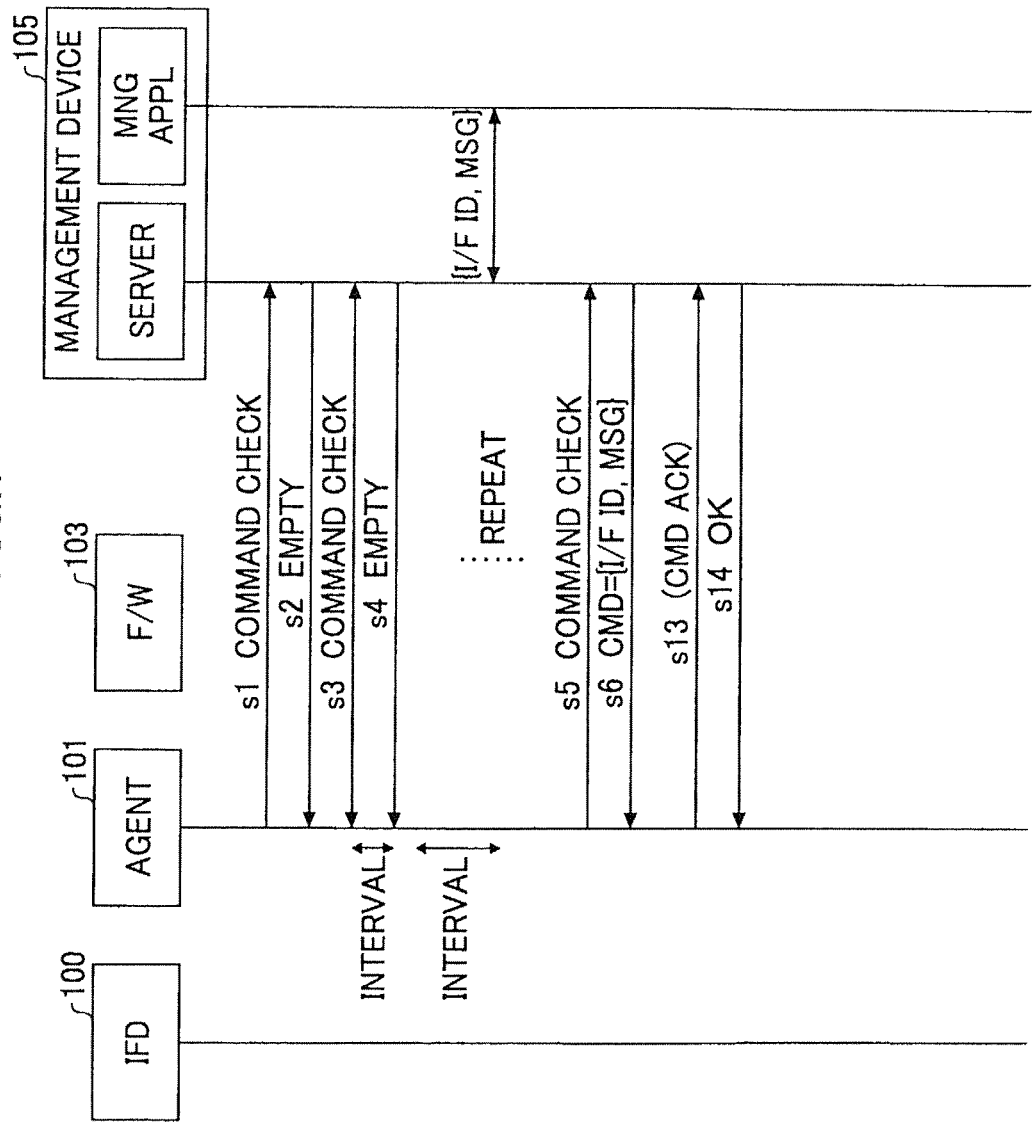
FIG. 7 is a diagram for explaining an example of the procedure of transmitting a management command from the management device to the agent device.
Figure 8:
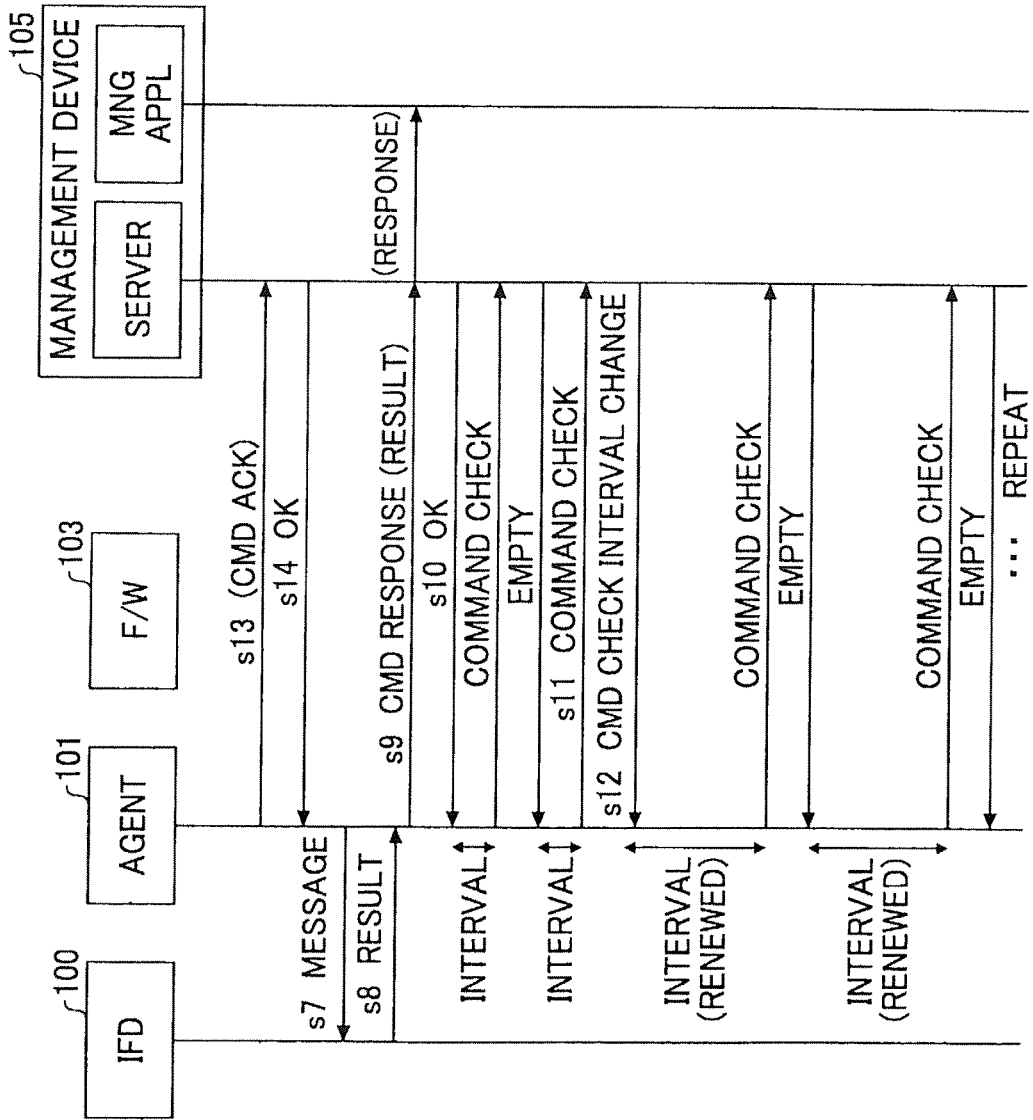
FIG. 8 is a diagram for explaining an example of the procedure of transmitting a command response from the agent device to the management device.

FIG. 7 shows an example of the procedure of transmitting a management command from the management device to the agent device. FIG. 8 shows an example of the procedure of transmitting a command response from the agent device to the management device.

The procedure of FIG. 7 includes steps s1 to s6, and the procedure of FIG. 8 includes steps s7 to s12. In addition, steps s13 and s14 are common to the procedures of FIG. 7 and FIG. 8.

In step s1 of the procedure of FIG. 7, the management command receiving unit 300 of the agent device 101 starts transmitting the command check to the management device 105.

In step s2, the management device 105 transmits a management command "empty" to the agent device 101 in response to the command check. This management command "empty" indicates that no request is currently made. Namely, in this state, the management device 105 does not transmit any request to the image-forming device 100 or the agent device 101.

After a fixed command check interval has elapsed, in step s3, the management command receiving unit 300 of the agent device O1 starts transmitting the command check to the management device 105 again.

In step s4, the management device 105 transmits the management command "empty" to the agent device 101 in response to the command check. This management command is also "empty."

In this manner, the management command receiving unit 300 of the agent device 101 repeats the transmission of the command check to the management device 105.

Next, in step s5, the management command receiving unit 300 of the agent device 101 starts transmitting the command check to the management device 105. In step s6, the management device 105 transmits a management command to the image-forming device 100 to the agent device 101.

In steps s7 to s10 of the procedure of FIG. 8, the image-forming-device communication unit 304 of the agent device 101 transmits the message, contained in the management command received from the management device 105, to the image-forming device 100.

The command response transmitting unit 305 of the agent device 101 transmits the response result received from the image-forming device 100 in the image-forming-device communication unit 304 of the agent device 101 to the management device 105.

The management device 105 transmits "O.K." which tells the purport that the response result was received to the management command receiving unit 300 of the agent device 101.

At the time, a series of processings to the management command are completed.

Each part mentioned above is realized by program processing of CPU.

Next, in s12, the agent device 101 starts the check of the command from step s11 to the management device 105.

In step s12, the management device 105 carries out the change request of the interval which starts the check of the command to the agent device 101.

Therefore, the agent device 101 changes the command check interval (or the connection start interval).

As shown in FIG. 8, after change of the connection start interval is longer than the connection start interval before change.

Each part of the procedure mentioned above is realized by program processing of CPU of the agent device 101 or the management device 105.

Figure 9:
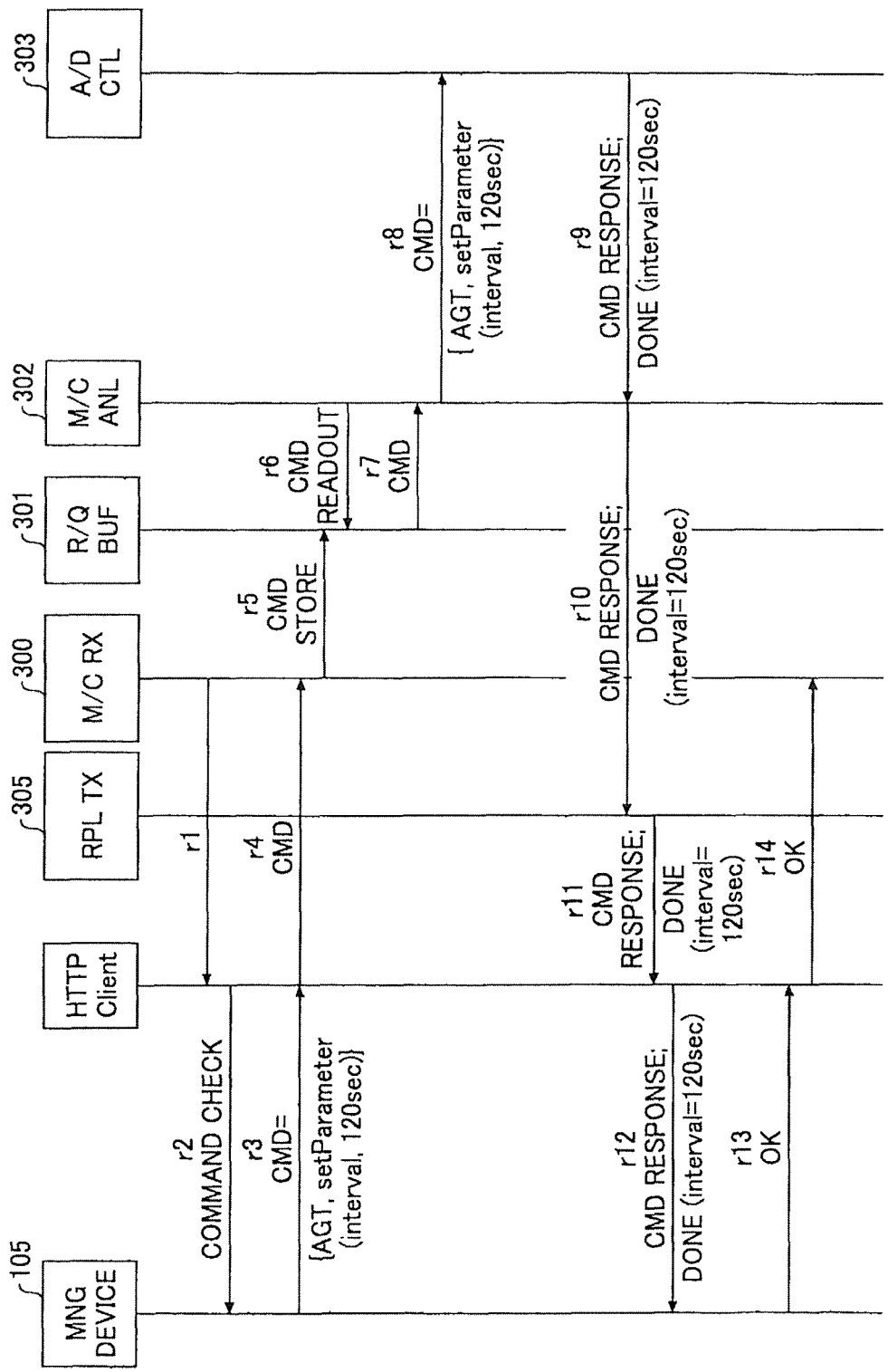
FIG. 9 is a diagram for explaining an example of the procedure of transmitting a management command from the management device to the agent device and transmitting a command response from the agent device to the management device.

FIG. 9 shows an example of the procedure of transmitting a management command from the management device to the agent device and transmitting a command response from the agent device to the management device.

Specifically, the communication procedure of FIG. 9 is a detailed procedure for changing the connection start interval in the communication procedure of FIG. 7 and FIG. 8.

In steps r1 and r2 of the procedure of FIG. 9, the management command receiving unit 300 starts transmitting the command check to the management device 105 through HTTP_Client.

In steps r3 and r4, in response to the command check the agent device, the management device 105 transmits a management command "{agent device, setParameter(command check interval, 120 sec)}" to the management command receiving unit 300 through the HTTP_Client. This management command indicated it is requested that the agent device O1 sets the command check interval (or the connection start interval) to 120 sec.

Next, in step r5, the request queue buffer 301 stores and retains the management command received by the management command receiving unit 300.

Next, in step r6, the management command analysis unit 302 requests reading of the management command from the request queue buffer 301. In step r7, the management command analysis unit 302 acquires the management command read from the request queue buffer 301. In step r8, based on the acquired command, the management command analysis unit 302 determines that the management command is a request being sent to the agent device 101, and transmits the management command to the agent-device control unit 303.

Next, in steps r9 and r10, the agent-device control unit 303 executes the received management command, changes the command check interval of the agent device 101 into 120 sec according to the command, and transmits a command response {done, (interval=120 sec)} through the management command analysis unit 302 to management command response transmitting unit 305.

Next, in steps r11 and r12, the command response transmitting unit 305 transmits the command response to the management device 105 through the HTTP_Client.

Next, in steps r13 and r14, the management command receiving unit 300 receives a reply signal "O.K." from the management device 105 through the HTTP_Client, which indicates that the command response have been received by the management device 105.

Thus, the procedure of FIG. 9 for changing the command check interval (or the connection start interval) to a new interval is completed.

Each part of the procedure mentioned above is realized by program processing of CPU of the agent device 101 or the management device 105.

Figure 10:
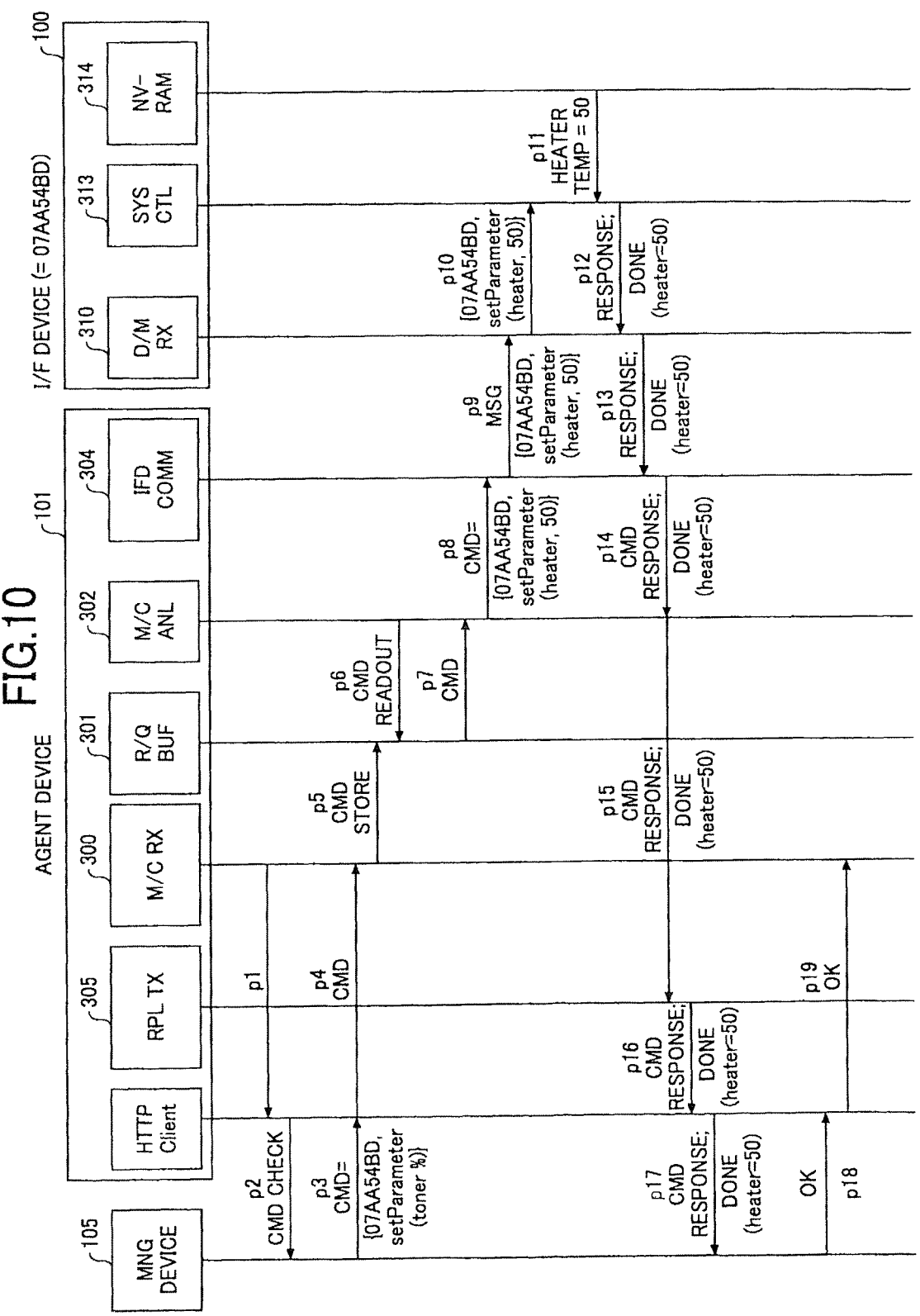
FIG. 10 is a diagram for explaining an example of the procedure of transmitting a management command from the management device to the agent device and transmitting a command response from the agent device to the management device.

FIG. 10 shows an example of the procedure of transmitting a management command from the management device to the agent device and transmitting a command response from the agent device to the management device.

Specifically, the procedure of the FIG. 10 is the procedure for setting the heater temperature of the image-forming device 100 to a new heater temperature by transmitting a management command from the management device 105 to the agent device 101.

In steps p1 and p2 of the procedure of FIG. 10, the management command receiving unit 300 starts transmitting the command check to the management device 105 through HTTP_Client.

In steps p3 and p4, in response to the command check from the agent device 101, the management device 105 transmits a management command "{07AA54BD, setParameter(heater temperature, 50)}" to the management command receiving unit 300 through HTTP_Client. This management command shows that it is requested to set the heater temperature of the target device 07AA54BD to 50 degrees.

Next, in step p5, the request queue buffer 301 stores and retains the management command received by the management command receiving unit 300.

Next, in step p6, the management command analysis unit 302 requires reading of the management command from the request queue buffer 301. In step p7, the management command analysis unit 302 acquires the management command read from the request queue buffer 301. In step p8, the management command analysis unit 302 determines that the management command is a request being sent to the image-forming device 100, and transmits the management command to the image-forming-device communication unit 304.

Next, in step p9, the management command is to be sent to the image-forming device 100, and the image-forming-device communication unit 304 transmits a device message "{setParameter(heater temperature, 50)}" to the device message receiving unit 310 of the image-forming device 100.

Next, in step p10, the device message receiving unit 310 transmits the device message to the system-control unit 313. In step p11, the system-control unit 313 writes the received message "heater temperature, 50" to the NV-RAM 314. In step p12, the system-control unit 313 transmits a response "done, heater temperature=50)" to the device message receiving unit 310.

Next, in step p13, the image-forming-device communication unit 304 receives the response "{done, heater temperature=50}" from the image-forming device 100.

Next, in steps p14 and p15, the management command analysis unit 302 receives the response "{done, heater temperature=50} from the image-forming-device communication unit 304, and transmits the same to the management command response transmitting unit 305 as a command response to the management command.

Next, in steps p16 and p17, the management command response transmitting unit 305 transmits the command response "{done, heater temperature=50}" to the management device 105 through the HTTP_Client.

Next, in steps p18 and p19, the management command receiving unit 300 receives a reply signal "O.K." from the management device 105 through the HTTP_Client, which indicates that the management device 105 has received the command response "{done, heater temperature=50}".

Thus, the procedure of FIG. 10 for setting the heater temperature of the image-forming device to a new temperature is completed.

Each part of the procedure mentioned above is realized by program processing of CPU of the agent device O1 or the management device 105.

Figure 11:
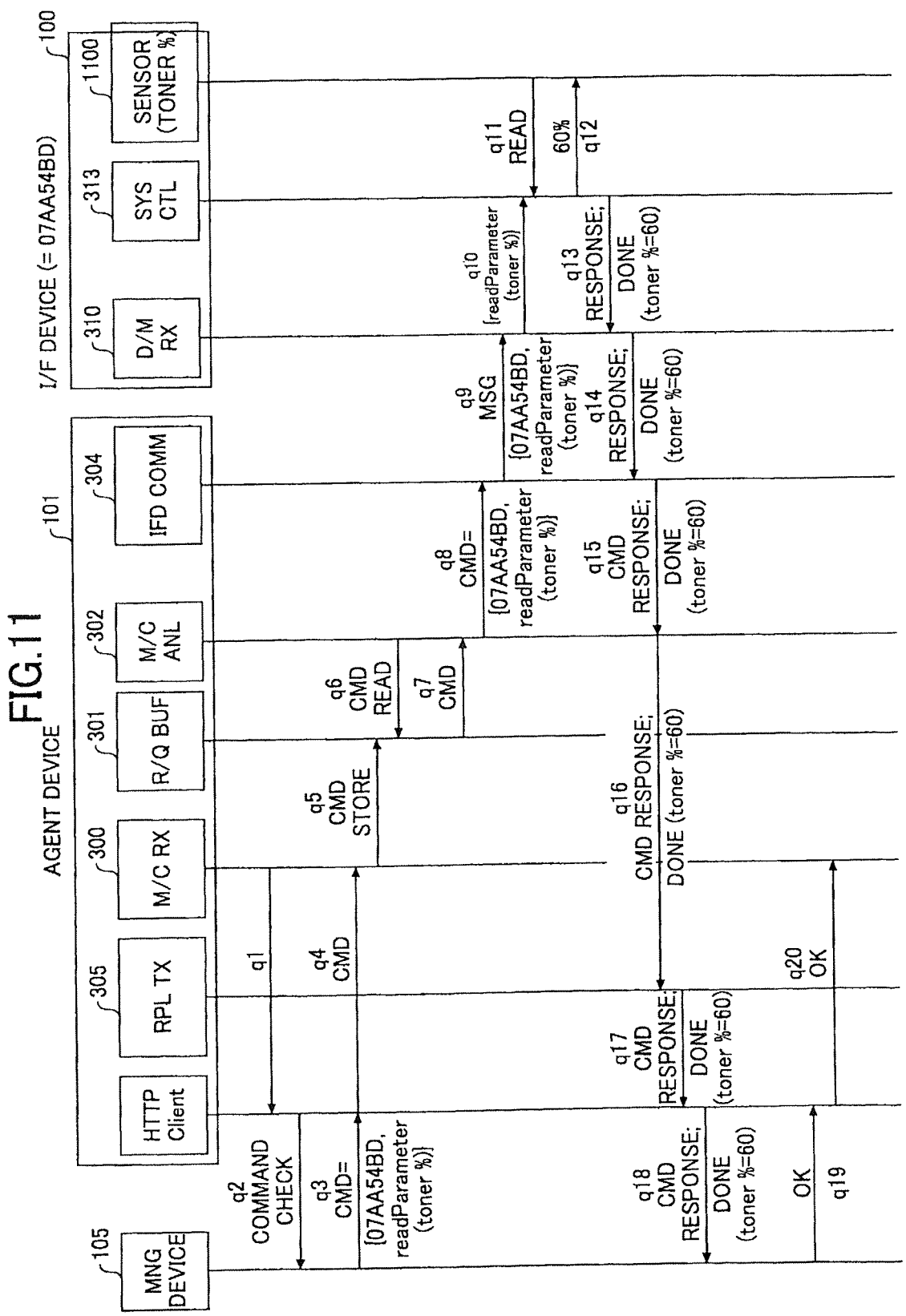
FIG. 11 is a diagram for explaining an example of the procedure of transmitting a management command from the management device to the agent device and transmitting a command response from the agent device to the management device.

FIG. 11 shows an example of the procedure of transmitting a management command from the management device to the agent device and transmitting a command response from the agent device to the management device.

Specifically, the communication procedure of FIG. 11 shows the procedure for reading the toner concentration of the image-forming device 100 by transmitting the management command from the management device 105 to the agent device 101.

As shown in FIG. 11, in steps q1 and q2, the management command receiving unit 300 transmits the command check to the management device 105 through the HTTP_Client, in order to start the connection between the agent device 101 and the management device 105.

Next, in steps q3 and r4, the management device 105 transmits the management command "{07AA54BD, readParameter(toner concentration)}" to the management command receiving unit 300 through the HTTP_Client in response to the connection started from the agent device. This management command indicates that it requests the reading of the toner concentration of the target device 07AA54BD.

Next, in step q5, the management command received by the management command receiving unit 300 is stored into the request queue buffer 301.

Next, in step q6, the management command analysis unit 302 transmits a reading request of the stored management command to the request queue buffer 301. In step q7, the management command analysis unit 302 acquires the management command read from the request queue buffer 301.

Next, in step q8, the management command analysis unit 302 determines that the acquired command is a management command to be sent to the image-forming device 100, and transmits the management command to the image-forming-device communication unit 304.

Next, in step q9, as the management command is to be sent to the image-forming device 100, the image-forming-device communication unit 304 transmits a device message "{readParameter(toner concentration)}" to the device message receiving unit 310 of the image-forming device 100.

Next, in step q10, the device message receiving unit 310 transmits the received device message to the system-control unit 313. In step q11, the system-control unit 313 transmits the reading request of toner concentration to the toner-concentration sensor 1100.

Next, in step q12, the system-control unit 313 reads the toner concentration from the toner-concentration sensor 1100.

Next, in steps q13 and q14, the image-forming-device communication unit 304 receives the command response "{done, toner concentration=60}" from the image-forming device 100.

Next, in steps q15 and 16, the management command analysis unit 302 receives the command response "{done, toner concentration=60} from the image-forming-device communication unit 304, and transfers the same to the command response transmitting unit 305.

Next, in steps q17 and q18, the management command response transmitting unit 305 transmits the command response "{done, toner concentration=60}" to the management device 105 through the HTTP_Client.

Next, in steps q19 and q20, the management command receiving unit 300 receives a reply signal "O.K." which shows the response "{done, toner concentration=60}" to the management command has been received by the management device 105.

Thus, the toner concentration reading procedure of FIG. 11 is completed.

Each part of the procedure mentioned above is realized by program processing of CPU of the agent device 101 or the management device 105.

Figure 12:
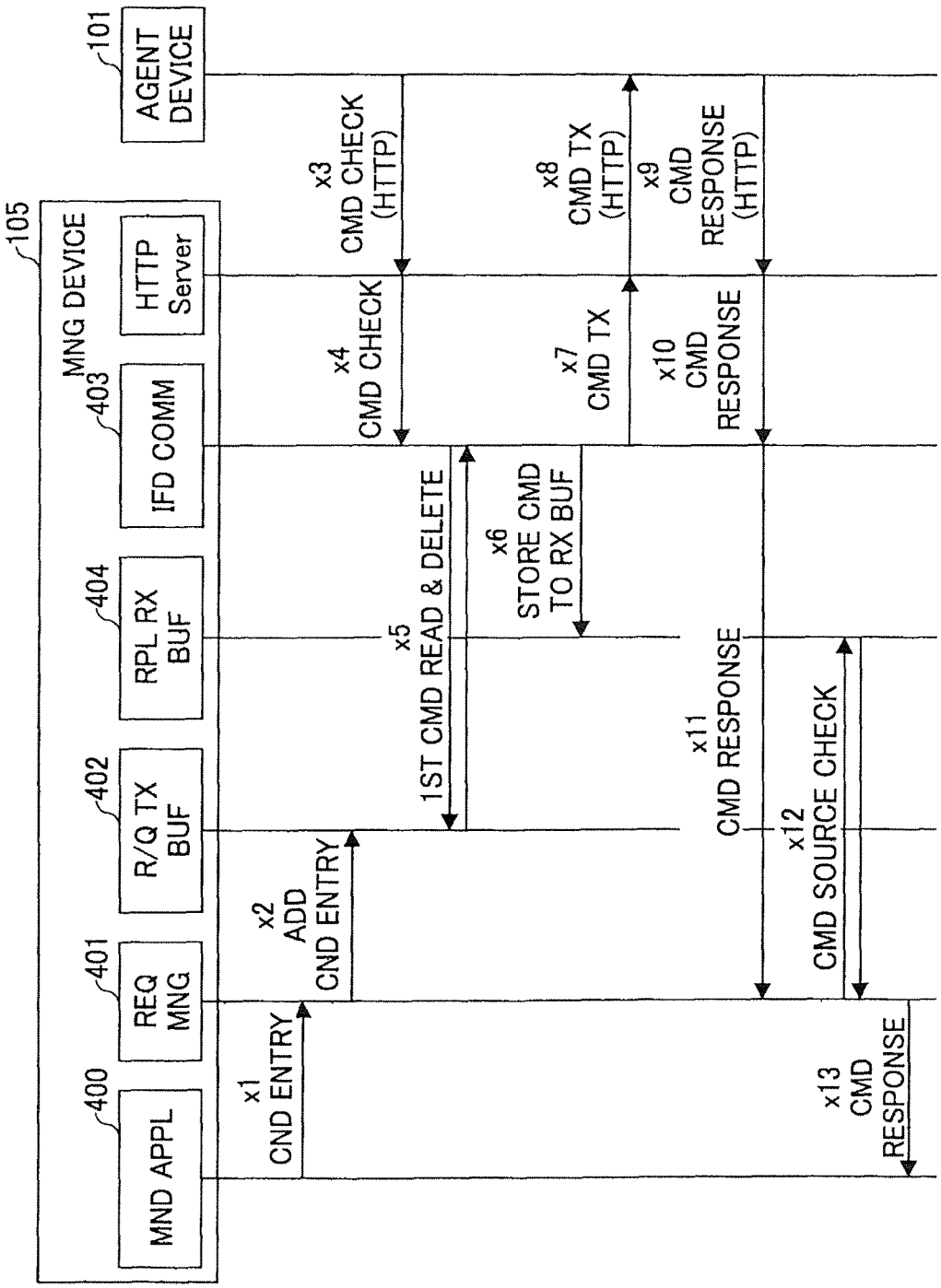
FIG. 12 is a diagram for explaining an example of the procedure of transmitting a management command from the management device to the agent device and transmitting a command response from the agent device to the management device.

FIG. 12 shows an example of the procedure of transmitting a management command from the management device to the agent device and transmitting a command response from the agent device to the management device.

In steps x1 and x2 of the communication procedure of FIG. 12, the request management unit 401 registers a management command, generated by the management application unit 400, into the request queue transmitting buffer 402.

Next, in steps x3 to x5, the agent-device communication unit 403 receives the command check from the agent device 101, acquires the first-registered management command from the request queue transmitting buffer 402, and deletes the acquired command from the request queue transmitting buffer 402.

Next, in steps x6 to x8, the management command acquired by the agent-device communication unit 403 is stored into the command response receiving buffer 404, and the management command is transmitted to the agent device 101 by the agent-device communication unit 403.

Next, in steps x9 to x11, the agent-device communication unit 403 receives the command response from the agent device 101, and transfers the same to the request management unit 401.

Next, in step x12, the request management unit 401 determines whether a command identifier (or the source application ID) of the command response received from the agent-device communication unit 403 is the same as a command identifier (or the source application ID) of the command which has been stored in the command response receiving buffer 404.

When the determination in step x12 is affirmative, the request management unit 401 transmits, in step x13, the command response to the management application unit 400 (or the source application).

Each part of the procedure mentioned above is realized by program processing of CPU of the agent device 101 or the management device 105.

Figure 13:
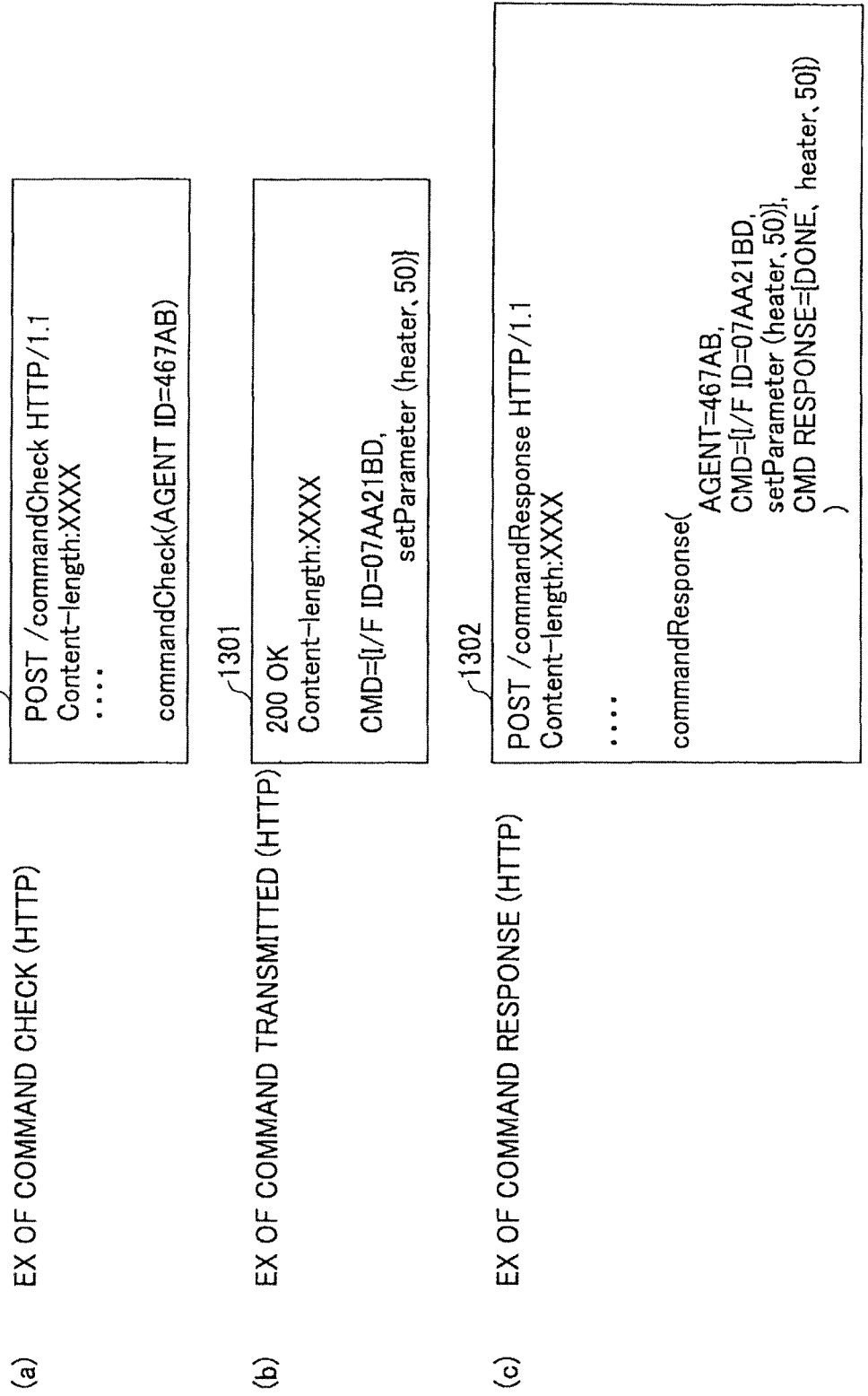
FIG. 13 is a diagram showing examples of the command check, the command transmitted, and the command response.

FIG. 13 shows examples of the command check, the command transmitted, and the command response.

As indicated by (a) in FIG. 13, the example 1300 of the command check (HTTP) is an example of the command check which the agent device 101 transmits to the agent-device communication unit 403 in step x3 of the procedure of FIG. 12. This example shows that the agent device 101 having transmitted the command check has "agent-device identifier 467AB".

Moreover, as indicated by (b) in FIG. 13, the example 1301 of the command transmitted (HTTP) is an example of the command which the agent-device communication unit 403 transmits, in step x7 of FIG. 12, to the agent device 101 according to the command check received from the agent device 101. In this example, the image-forming device set as the target device of the command has "target-device identifier 07AA54BD", and it is shown that the contents of the command are "setting heater temperature to 50 degrees".

Moreover, as indicated by (c) in FIG. 13, the example 1302 of the command response (HTTP) is an example of the command response which the agent device 101 transmits to the management device 105 in step x9 of FIG. 12. The agent device 101 having transmitted the command response has "agent-device identifier 467AB", the image-forming device which is the target device of the command has "target-device identifier 07AA54BD", and this example shows that the contents of the command "heater temperature is set to 50 degrees" are completed.

Figure 14:
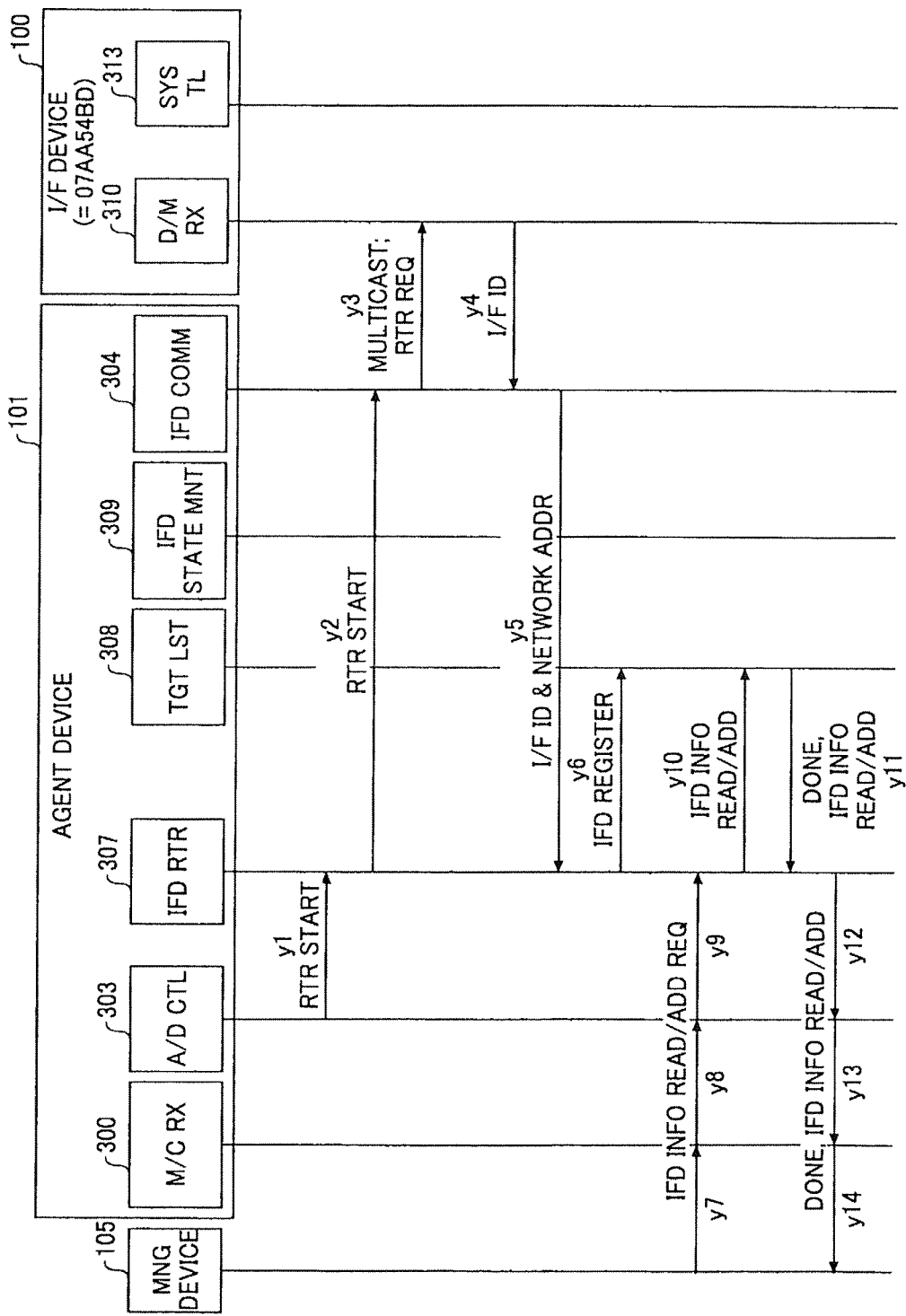
FIG. 14 is a diagram for explaining an example of the procedure of obtaining a list of the state data of the image-forming devices by the agent device.

Next, other preferred embodiments of the image-forming-device management system of the present invention are explained using FIG. 14 and FIG. 15.

FIG. 14 shows an example of the procedure of obtaining a list of the device-state data of the image-forming devices by the agent device.

As shown in FIG. 14, in step y1, the agent-device control unit 303 starts retrieval processing for acquiring the device information on the image-forming device 100 to the image-forming-device retrieval unit 307.

Next, in step y2, the image-forming-device retrieval unit 307 determines the image-forming device 100 from which the device information is acquired in accordance with the start of the retrieval processing by the agent-device control unit 303.

Next, in steps y3 and y4, the image-forming-device communication unit 304 receives the device information of the image-forming device 100 by multicasting, which information is a device identifier of the image-forming device 100. Alternatively, it is possible to acquire the device information of the image-forming device 100 by broadcasting.

Next, in steps y5 and y6, the network address of the device identifier whom the image-forming-device retrieval unit 307 received by the image-forming-device communication unit 304, and its image-forming device 100 which carries out this is acquired, and it registers with the target device list unit 308.

The list of the image-forming devices 100 used as the target for the monitoring is automatically generated by the above-mentioned communication procedure.

By using this target device list unit 308, the connection start interval of the agent device with respect to the management device 105 can be changed.

Next, in steps y7 to y14, the management device 105 can acquire the device information on the image-forming device 100 registered into the target device list unit 308.

Moreover, the management device 105 can also add the image-forming device 100 newly made applicable to the monitoring to the target device list unit 308.

Each part of the procedure mentioned above is realized by program processing of CPU of the agent device 101 or the management device 105.

FIG. 15 shows an example of the procedure of changing the connection start interval of the agent device in accordance with the device-state information of the image forming device.

As shown in FIG. 15, in step z1, the agent-device control unit 303 starts the setting of predetermined monitoring conditions to the device-state monitoring unit 309 and causes the device-state monitoring unit 309 to start the monitoring of the target device.

Next, in steps z2 and z3, the device-state monitoring unit 309 reads the device identifier (07AA54BD) of the target device from the target device list unit 308, and transfers the device identifier of the target device to the image-forming-device communication unit 304.

Next, in step z4, the image-forming-device communication unit 304 transmits a command for acquiring the state of the target image-forming device 100, to the device message receiving unit 310 of the image-forming device 100.

Next, in steps z5 to z7, the device message receiving unit 310 transmits the command to the system control unit 313, receives a device message indicating the state of the image-forming device 100 from the system control unit 313, and transmits the device message of the target image-forming device 100 to the image-forming-device communication unit 304 of the agent device 101.

Next, in step z8, the image-forming-device communication unit 304 transmits the device message of the image-forming-device 100 to the device-state monitoring unit 309.

In this case, it is assumed that the device-state monitoring unit 309 determines that the state of the image-forming device 10 does not meet the monitoring conditions. Thus, the control of the device-state monitoring unit 309 is transferred to step z9.

In step z9, the device-state monitoring unit 309 transmits a device state change message concerning the target device to the agent-device control unit 303.

In step z10, in response to the received device state change message, the agent-device control unit 303 changes the connection start interval of the management command receiving unit 300.

Each part of the procedure mentioned above is realized by program processing of the CPU of the agent device 101.

Thus, according to the present embodiment, in addition to the remote management of the image-forming devices by the previous preferred embodiment, the image-forming-device management system carries out automatic generation of the image-forming-device list set as the target device of the monitoring. When the state of the target image-forming device 100 does not meet the monitoring conditions, the agent device of the present embodiment is capable of changing the connection start interval of the management command receiving unit 300.

Next, another preferred embodiment of the image-forming-device management system of the present invention will be explained using FIG. 16.

FIG. 16 shows an example of the procedure of obtaining the device state data of the image forming device stored in the agent device.

In FIG. 16, the procedure of steps w1 to w8 is the same as the procedure of steps z1 to z8 of FIG. 15 mentioned above, and a description thereof will be omitted.

In the communication procedure of FIG. 16, the device-state data of the image-forming device 100 acquired by the agent device 101 are saved in the device-state memory 317 in step w9.

Next, in steps w10 and w11, the management command receiving unit 300 transmits the command check to the management device 105.

Next, in steps w12 and w13, the management device 105 transmits the management command for acquiring the heater temperature of the image-forming device 100 (the device identifier 07AA54BD) from the device-state memory 317, to the management command receiving unit 300.

Next, in step w14, the management command is held at the request queue buffer 301.

Next, in step w15, the management command analysis unit 302 reads out the management command from the request queue buffer 301, and analyzes the command to confirm the image-forming device which the command is sent to.

Next, in steps w16 and w17, based on the management command judged by the management command analysis unit 302 that it is requested the acquisition of the device-state data stored in the device-state memory 317, the agent-device control unit 303 acquires the device-state data from the device-state memory 317.

Next, in step w18, the acquired device-state data are shifted to the command response transmitting unit 305.

Next, in steps w19 to w22, the device-state data which are stored in the device-state memory 317 are received by the management device 105, and the reply signal "O.K." is transmitted from the management device 105 to the management command receiving unit 300.

Each part of the procedure mentioned above is realized by program processing of CPU of the agent device 101 or the management device 105.

Thus, according to the present embodiment, since the state data of the image-forming device 100 are accumulated in the device-state memory 317 in addition to remote management of the image-forming devices in the previous preferred embodiment, data acquisition, such as the previous history records of the image-forming devices 100, can be performed quickly.

As described in the foregoing, according to the agent device of the present invention, the management command receiving unit starts the connection with the management device which carries out remote management of the image-forming devices in the local network through the Internet, and receives the management command from the management device according to the connection via the firewall. Thus, it is possible that the image-forming-device management system, including the agent device of the above-described embodiment, performs remote management of the image-forming device from the management device, without increasing the cost greatly.

The present invention is not limited to the above-described embodiments, and variations and modifications may be made without departing from the scope of the present invention.

Further, the present invention is based on Japanese priority applications No. 2002-049056, filed on Feb. 26, 2002; No. 2002-049062, filed on Feb. 26, 2002; No. 2002-049068, filed on Feb. 26, 2002; No. 2002-084081, filed on Mar. 25, 2002; No. 2003-027380, filed on Feb. 4, 2003; No. 2003-027381, filed on Feb. 4, 2003; and No. 2003-0027382, filed on Feb. 4, 2003, the entire contents of which are hereby incorporated by reference.

What is claimed is:

1. An agent device connected with one or more image-forming devices in a local network having a firewall provided therein, comprising:
a command receiving unit configured to start a connection with a management device which carries out remote management of the one or more image-forming devices in the local network through the Internet, and receive a plurality of management commands from the management device via the firewall, the plurality of management commands being sent by the management device in response to said connection and including a management command sent to the agent device and a management command sent to the one or more image-forming devices;
a request-queue buffer storing the plurality of management commands received by the command receiving unit; and
a management command analysis unit configured to acquire each of the plurality of management commands stored in the request-queue buffer, and determine whether the acquired management command is a management command sent to the agent device, or a management command sent to the one or more image-forming devices,
wherein the management command analysis unit transmits the management command to an agent-device control unit provided in the agent device in response to a determination that the acquired management command relates to at least a setting of a connection start interval, and the management command analysis unit transmits the management command to an image-forming-device communication unit connected to the one or more image-forming devices in response to a determination that the acquired management command relates to device-state information regarding at least a setting of operation of a corresponding one of the image-forming devices.

2. An agent device of claim 1, further comprising a command response transmitting unit inside the firewall adapted for transmitting the device-state information, received by the image-forming-device communication unit, to the management device outside the firewall through the Internet.

3. An agent device of claim 1, wherein the image-forming-device communication unit is adapted to transmit a device message to the corresponding image-forming device via the local network based on a particular received management command prior to execution of the management command.

4. An agent device of claim 1, wherein the image-forming-device communication unit is adapted to receive the device-state information from the corresponding image-forming device via the local network as a response to a device message after execution of the management command.

5. An image-forming-device management system including an agent device connected with one or more image-forming devices, comprising:
a management device configured for carrying out remote management of the image-forming devices through the Internet;
a command receiving unit inside a firewall configured to start a connection with the management device outside the firewall and receiving management commands from the management device via the firewall, the management commands being sent by the management device in response to said connection and including a management command sent to the agent device and a management command sent to the one or more image-forming devices;
a request-queue buffer configured for storing said management commands received by the command receiving unit; and
a management command analysis unit configured to acquire said management commands stored in the request-queue buffer, and to determine whether a particular acquired management command is a management command sent to said agent device or a management command sent to the one or more image-forming devices,
wherein the management command analysis unit transmits the management command to an agent-device control unit provided in the agent device in response to a determination that the acquired management command relates to at least a setting of a connection start interval, and the management command analysis unit transmits the management command to an image-forming-device communication unit connected to the one or more image-forming devices in response to a determination that the acquired management command relates to device-state information regarding at least a setting of operation of a corresponding one of the image-forming devices.

6. An image-forming-device management system of claim 5, wherein said one or more image forming devices are in a local network having a firewall provided therein.

7. An image-forming-device management system of claim 5, further comprising a command response transmitting unit, inside the firewall, adapted for transmitting the device-state information, received by the image-forming-device communication unit, to the management device outside the firewall through the Internet.

8. An image-forming-device management system of claim 5, wherein the image-forming-device communication unit is adapted to transmit a device message to the corresponding image-forming device via a local network based on the received management command prior to execution of the management command.

9. An image-forming-device management system of claim 5, wherein the image-forming-device communication unit is adapted to receive the device-state information from the corresponding image-forming device via a local network as a response to a device message after the execution of the management command.

10. A non-transitory computer-readable storage medium storing a computer program therein, when executed by a processor, causing an agent device to execute an image-forming-device management method, the method comprising steps of:

starting a connection from a command receiving unit of the agent device inside a firewall with a management device outside the firewall;

receiving a plurality of management commands from the management device via the firewall, the plurality of management commands being sent by the management device in response to the connection and including a management command sent to the agent device for at least configuring a connection start interval and a management command sent to one or more image-forming devices for at least setting an operation of a corresponding one of the image-forming devices;

storing the plurality of management commands received by the command receiving unit in a request-queue buffer; and acquiring said management commands, stored in the request-queue buffer, in a management command analysis unit;

determining whether a particular one of the acquired management commands is a management command sent to the agent device or a management command sent to one or more image-forming devices;

transmitting the management command to an agent-device control unit provided in the agent device in response to a determination that the acquired management command relates to at least a setting of a connection start interval; and transmitting the management command to an image-forming-device communication unit connected to the one or more image-forming devices in response to a determination that the acquired management command relates to device-state information regarding at least a setting of operation of a corresponding one of the image-forming devices.

11. A computer-readable storage medium of claim 10, further comprising using the agent device connected with one or more image-forming devices in a local network having a firewall provided therein.

12. A computer-readable storage medium of claim 11, further comprising transmitting to a corresponding image-forming device a device message, by the agent device via the local network, based on the received management command prior to execution of the management command.

13. A computer-readable storage medium of claim 11, further comprising receiving device-state information from a corresponding image-forming device, by the agent device via the local network, as a response to the device message after the execution of the management command.

14. A computer-readable storage medium of claim 10, further comprising carrying out a remote arrangement, using said management device, of the image-forming devices in a local network through the Internet.

15. A computer-readable storage medium of claim 10, further comprising transmitting inside the firewall the device-state information to the management device outside the firewall through the Internet.

* * * * *